US010356822B2

(12) United States Patent
Futaki et al.

(10) Patent No.: US 10,356,822 B2
(45) Date of Patent: *Jul. 16, 2019

(54) RADIO COMMUNICATION SYSTEM, COMMUNICATION APPARATUS, RADIO COMMUNICATION NETWORK SYSTEM AND METHOD THEREFOR

(71) Applicant: NEC CORPORATION, Tokyo (JP)

(72) Inventors: Hisashi Futaki, Tokyo (JP); Jinsock Lee, Tokyo (JP); Kojiro Hamabe, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,762

(22) Filed: Feb. 26, 2018

(65) Prior Publication Data
US 2018/0184462 A1  Jun. 28, 2018

Related U.S. Application Data

(60) Continuation of application No. 15/424,022, filed on Feb. 3, 2017, now Pat. No. 9,986,589, which is a
(Continued)

(30) Foreign Application Priority Data

Mar. 7, 2008  (JP) .................................. 2008-057726

(51) Int. Cl.
*H04W 4/00*    (2018.01)
*H04W 74/08*   (2009.01)
(Continued)

(52) U.S. Cl.
CPC ....... *H04W 74/0833* (2013.01); *H04L 1/0026* (2013.01); *H04W 8/24* (2013.01);
(Continued)

(58) Field of Classification Search
CPC combination set(s) only.
See application file for complete search history.

(56) References Cited

U.S. PATENT DOCUMENTS 8,515,480 B2   8/2013  Kuroda
8,570,956 B2  10/2013  Park et al.
(Continued)

FOREIGN PATENT DOCUMENTS

CN   1384624 A    12/2002
CN  101682591 B    9/2012
(Continued)

OTHER PUBLICATIONS

Communication dated Mar. 28, 2018 from the Japanese Patent Office in counterpart application No. 2017-037986.
(Continued)

*Primary Examiner* — Yemane Mesfin
*Assistant Examiner* — Abdelillah Elmejjarmi
(74) *Attorney, Agent, or Firm* — Sughrue Mion, PLLC

(57) ABSTRACT

A radio communication system provided with a communication device and a radio communication network system is characterized by comprising a transmission delay estimate information transmitting means for transmitting transmission delay estimate information to the radio communication network system when the transmission condition of the transmission delay estimate information is met.

4 Claims, 21 Drawing Sheets

Related U.S. Application Data continuation of application No. 13/674,248, filed on Nov. 12, 2012, now Pat. No. 9,603,103, which is a division of application No. 12/920,443, filed as application No. PCT/JP2009/054171 on Mar. 5, 2009, now Pat. No. 9,338,752.

(51) Int. Cl.
| | |
|---|---|
| *H04W 52/24* | (2009.01) |
| *H04W 74/00* | (2009.01) |
| *H04L 1/00* | (2006.01) |
| *H04W 8/24* | (2009.01) |
| *H04W 72/04* | (2009.01) |
| *H04W 88/08* | (2009.01) |

(52) U.S. Cl.
CPC ......... *H04W 52/24* (2013.01); *H04W 72/042* (2013.01); *H04W 74/004* (2013.01); *H04W 88/08* (2013.01)

(56) References Cited

U.S. PATENT DOCUMENTS

| | | |
|---|---|---|
| 2005/0163064 A1 | 7/2005 | Choi et al. |
| 2005/0286424 A1 | 12/2005 | Peeters et al. |
| 2006/0262766 A1 | 11/2006 | Peleg |
| 2007/0004430 A1 | 1/2007 | Hyun et al. |
| 2008/0031224 A1 | 2/2008 | Nanda et al. |
| 2008/0076455 A1 | 3/2008 | Kim et al. |
| 2008/0233916 A1* | 9/2008 | Wang ............... H04W 4/90 455/404.2 |
| 2009/0041240 A1* | 2/2009 | Parkvall ............. H04W 74/004 380/247 |
| 2009/0247211 A1* | 10/2009 | Kuroda ............... H04W 52/50 455/522 |

FOREIGN PATENT DOCUMENTS

| | | |
|---|---|---|
| GB | 1445336 | 8/1976 |
| GB | 2410861 A | 8/2005 |
| GB | 2445336 A | 7/2008 |
| JP | 2006-287489 A | 10/2006 |
| WO | 03/003643 A1 | 1/2003 |
| WO | 03/041438 A1 | 5/2003 |
| WO | 2007/052753 A1 | 5/2007 |
| WO | 2007/107943 A2 | 9/2007 |
| WO | 2008/054112 A2 | 5/2008 |
| WO | 2008/084953 A1 | 7/2008 |

OTHER PUBLICATIONS

"Initial Access Procedures for LTE RACH", Philips 3GPP TSG-RAN WG2 Ad-Hoc Meeting on LTE, R2-061904, Jun. 30, 2006, 8 pages.
Communication dated Jun. 18, 2015, issued by the U.S. Patent and Trademark Office in corresponding U.S. Appl. No. 12/290,443.
Communication dated Sep. 9, 2014 from the United States Patent and Trademark Office in counterpart U.S. Appl. No. 12/920,443.
Ericsson, "Aperiodic CQI reporting", R1-074381, 3GPP TSG-RAN WG1 #50bis, Shanghai, China, Oct. 8-12, 2007, 2 pages.
International Search Report for PCT/JP2009/054171, dated Apr. 21, 2009.
Office Action dated Apr. 23, 2014, issued by the Japan Patent Office in corresponding Japanese Application No. 2013-196213.
Office Action dated Jul. 24, 2013, issued by the Japanese Patent Office in counterpart Japanese Application No. 2010-501955.
Philips, "Performance of CPCH", TSG-RAN Working Group 1, Meeting No. 7, Aug. 30-Sep. 3, Hanover, Germany, TSGR1#7(99)b36, XP 50090358, p. 2-28.
Samsung Electronics Co., Ltd., Siemens AG, and CWTS, Propagation Delay Measurement in 1.28 Mcps UTRA TDD [online], 3GPP TSG-RAN WG1 #17, internet<URL:http://www.3gpp.org/ftp/tsg_ran/WG1_RL1/TSGR1_17/Docs/Zips/R1-00-1268.zip>, Nov. 24, 2000, R1-00-1268 pp. 1-3.
"3GPP TS 36.300 V8.3.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) Dec. 2007, V8.3.0, pp. 47-48 (5 pages total).
Communication dated Jan. 8, 2015, issued by the U.S. Patent and Trademark Office in counterpart U.S. Appl. No. 13/674,248.
Extended European Search Report, dated Apr. 14, 2014, issued by the European Patent Office, in counterpart Application No. 09718099.6.
Communication dated Mar. 3, 2015 from the State Intellectual Property Office of the People's Republic of China in counterpart application No. 201310055519.5.
Communication dated Nov. 24, 2015 from the United States Patent and Trademark Office issued in counterpart U.S. Appl. No. 14/805,638.
Communication dated May 18, 2016 from the United States Patent and Trademark Office in U.S. Appl. No. 13/674,248.
Communication dated Jun. 2, 2014 from the United States Patent and Trademark Office in U.S. Appl. No. 13/674,248.
Communication dated Sep. 14, 2015 from the United States Patent and Trademark Office in U.S. Appl. No. 13/674,248.
"UE reporting based PRACH control" 3GPP TSG-RAN WG2#60, Jeju, Korea, R2-074914, 4.4.8 PRACH retransmissions, NEC, Nov. 5-9, 2007 (2 pages total).

\* cited by examiner

FIG. 16
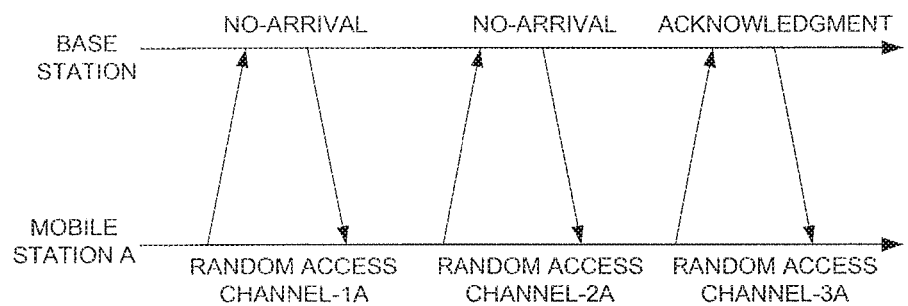
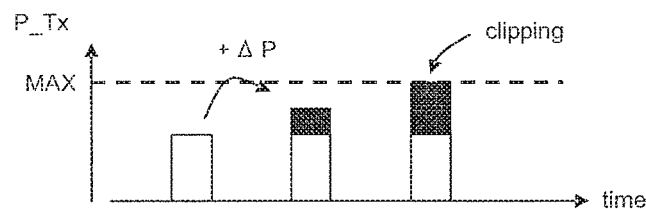
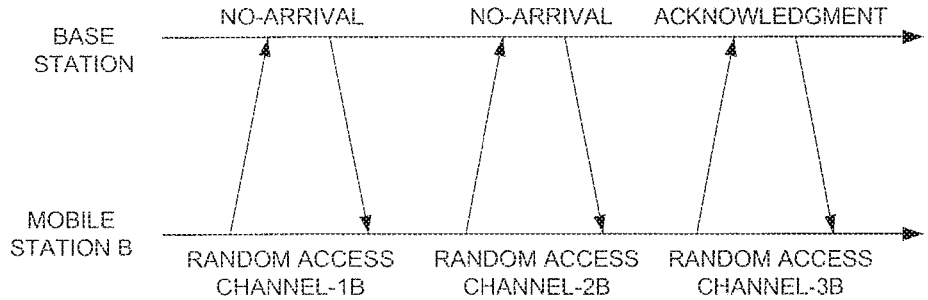
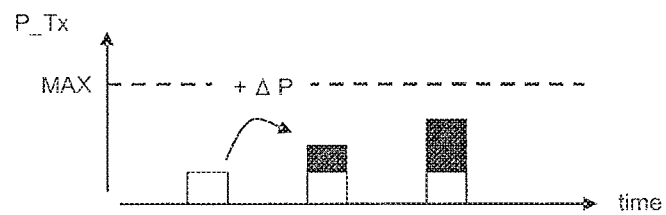

US 10,356,822 B2

RADIO COMMUNICATION SYSTEM, COMMUNICATION APPARATUS, RADIO COMMUNICATION NETWORK SYSTEM AND METHOD THEREFOR

CROSS REFERENCE TO RELATED APPLICATIONS

This application is a Continuation Application of U.S. patent application Ser. No. 15/424,022, filed Feb. 3, 2017, which is a Continuation Application of U.S. patent application Ser. No. 13/674,248, filed Nov. 12, 2012, now U.S. Pat. No. 9,603,103, which is a Divisional of U.S. patent application Ser. No. 12/920,443, filed Aug. 31, 2010, now U.S. Pat. No. 9,338,752, which is a national stage of International Application No. PCT/JP2009/054171, filed Mar. 5, 2009, claiming priority based on Japanese Patent Application No. 2008-057726, filed Mar. 7, 2008, the contents of all of which are incorporated herein by reference in their entirety.

APPLICABLE FIELD IN THE INDUSTRY

The present invention relates to a radio communication system, a communication apparatus, a radio communication network system, and a method therefor.

BACKGROUND ART

A transmission power of RACH (Random Access Channel) in 3GPP UMTS/LTE is decided based upon a power offset designated by a base station or a fixed power value common to one cell. However, the base station cannot recognize that one mobile station has tried to make a connection to the base station over the RACH until the base station receives the RACH correctly. For this, when the base station is not able to correctly receive the RACH coming from the mobile station, the transmission power cannot be adaptively controlled according to the situation of transmission of the RACH from the mobile station to the base station.

Thereupon, the technology in which the mobile station transmits transmission delay estimation information on the RACH together with a preamble or data and the base station decides a designation value for setting the transmission power of the RACH according to the transmitted transmission delay estimation information is proposed (Patent document 1). Additionally, the transmission delay estimation information is the number of times of transmission or the number of times of retransmission of the data or the preamble, a time elapsed since initial transmission of the data or the preamble, a timing of the initial transmission of the data or the preamble, or the like. Additionally, the so-called preamble is a bit pattern known to the base station, and a signal unknown to the base station such as user data or a control signal is not transmitted as the preamble.

Hereinafter, the case of applying the technology of the Patent document 1 related to the present invention to an E-UTRA system now under consideration in the 3GPP will be explained.

FIG. 22 is a conceptual diagram of the system to which the Patent document 1 related to the present invention is applied. In the system of the technology of the Patent document 1, a plurality of the base station are present adjacently to one another, a plurality of the mobile stations transmit or receive data on a downlink or an uplink to or from each of the base stations, OFDM (Orthogonal Frequency Division Multiple Access) is used for the downlink, and SC-FDMA (Single-Carrier Frequency Division Multiple Access) is used for the uplink. Furthermore, each of the mobile stations and base stations realize functions to be described below by a control program stored in a memory of each of the mobile stations and base stations.

Each base station transmits on the downlink at least a broadcast channel (BCH) for transmitting broadcast information such as system information, a common pilot channel (CPICH) for transmitting a pilot signal, and a common channel (AICH: Acquisition Indicator Channel) for transmitting an acknowledgment signal (ACK signal) in response to uplink data transmission.

FIG. 23 is a sequence diagram illustrating one example of an operation of the above-mentioned system.

One mobile station transmits or receives data based upon the system information transmitted over the BCH, receives the CPICH in a predetermined cycle to ensure synchronization, and measures a reception power of the CPICH (step 1-1). And, the mobile station transmits the preamble over a random access channel (RACH) RACH-1 based upon RACH transmission power information notified over the BCH and a CPICH reception power (Step 1-2).

Herein, when the base station cannot detect the RACH-1, the base station transmits NACK over the AICH without transmitting the ACK (Step 1-3).

Then, the mobile station transmits RACH-2 by increasing the transmission power by a power ramping step size that is included in the RACH transmission power information (Step 1-4).

The base station, upon detecting the RACH-2, transmits the ACK (Step 1-5).

The mobile station, upon receipt of the acknowledgment (after receiving), transmits the transmission delay estimation information over a RACH message part (Step 1-6).

The base station modifies the RACH transmission power information of the BCH based upon the transmission delay estimation information, and transmits it (Step 1-7).

FIG. 24 is a sequence diagram illustrating an example of another operation in the above-mentioned system.

One mobile station transmits or receives data based upon the system information transmitted over the BCH. Further, the mobile station receives the CPICH in a predetermined cycle to ensure synchronization and measures a reception quality of the CPICH (Step 2-1).

When user data or a control signal to be transmitted occurs to the mobile station, the mobile station transmits the transmission delay estimation information using a random access channel (RACH) that is one of uplink wireless channels (Step 2-2). A RACH transmission power at this time is decided based upon a value indicated by the base station using the BCH.

When the base station cannot detect the RACH of the mobile station, the base station does not transmit the ACK over the AICH (Step 2-3). Further, when the base station detects the RACH, the base station transmits the ACK over the AICH (Step 2-5).

When the mobile station transmits the preamble over the RACH, the mobile station receives the random access response over the AICH after a predetermined time, and retransmits the transmission delay estimation information at a predetermined timing until the mobile station receives an acknowledgment signal (ACK signal) indicating that the preamble transmitted by its own station has been correctly received (Step 2-4).

Performing such a process enables the base station to control information on the RACH transmission power indicated by the BCH so that a delay required until the data or the preamble, which is transmitted over the RACH, is correctly received is controlled to an appropriate value, and to reduce interference by setting the transmission power of the mobile station as low as possible while effectively reducing the data transmission delay.

Patent document 1: Publication number: WO2007/052753

DISCLOSURE OF THE INVENTION

Problems to be Solved by the Invention

In the related technology mentioned above, all of the mobile stations, which transmit the RACH, transmit the transmission delay estimation information.

However, the related technology necessitates a lot of wireless resources because all of the mobile stations transmit the transmission delay estimation information. In particular, transmitting the transmission delay estimation information together with the preamble leads to excessive consumption of the wireless resources because the mobile station transmits the transmission delay estimation information also when the RACH is not detected.

Thereupon, the present invention has been accomplished in consideration of the above-mentioned problems, and an object thereof is to provide a radio communication technology of transmitting the transmission delay estimation information while reducing the consumption of the wireless resources.

Means to Solve the Problem

The present invention for solving the above-mentioned problems is a radio communication system comprising a communication apparatus and a radio communication network system, wherein the communication apparatus comprises a transmission delay estimation information transmission unit for transmitting transmission delay estimation information to the radio communication network system when a transmission condition of transmission delay estimation information is met.

The present invention for solving the above-mentioned problems is a communication apparatus, comprising a transmission delay estimation information transmission unit for transmitting transmission delay estimation information to a radio communication network system when a transmission condition of transmission delay estimation information is met.

The present invention for solving the above-mentioned problems is a radio communication network system in a communication system for transmitting transmission delay estimation information when a communication apparatus meets a transmission condition of the transmission delay estimation information, said radio communication network system comprising a common control unit for causing the communication apparatus to commonly transmit the transmission delay estimation information.

The present invention for solving the above-mentioned problems is a radio communication method, wherein a communication apparatus transmits transmission delay estimation information to a radio communication network system when a transmission condition of the transmission delay estimation information is met.

An Advantageous Effect of the Invention

The present invention makes it possible to reduce the wireless resources for transmitting the transmission delay estimation information as compared with the case of the convention art.

BRIEF DESCRIPTION OF THE DRAWINGS

FIG. 16 is a diagram for explaining an example 3.

Figure 1:
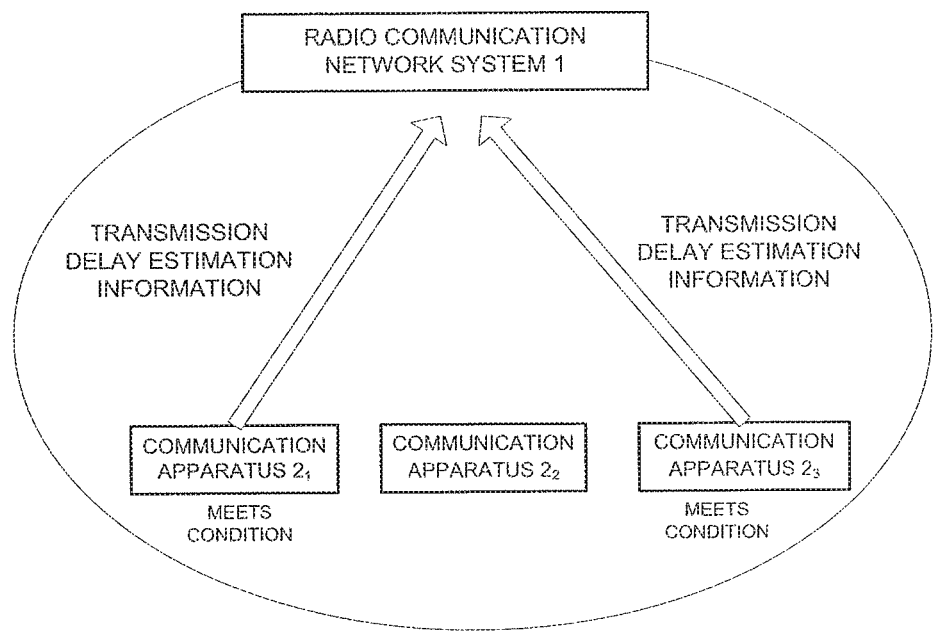
FIG. 1 is a diagram for explaining an outline of the present invention.

DESCRIPTION OF NUMERALS 1 radio communication network system
$2_1$ to $2_3$ communication apparatuses
11 reception processing unit
12 signal separation unit
13 pilot signal measurement unit
14 transmission power calculation unit 15 acknowledgment signal determination unit
16 transmission delay estimation information generation unit
17 buffer
18 signal combining unit
19 transmission processing unit
20 transmission determination unit
21 reception processing unit
22 decoding unit
23 error determination unit
24 signal separation unit
25 transmission delay estimation unit
26 power offset control unit
27 control signal generation unit
28 signal combining unit
29 transmission processing unit

[Best Mode For Carrying out the Invention]

An outline of the present invention will be explained.

FIG. 1 is a diagram for explaining an outline of the present invention.

As shown in FIG. 1, communication apparatuses $2_1$ to $2_3$ are managed by a radio communication network system 1. While conventionally, all of the communication apparatuses $2_1$ to $2_3$, which transmitted the RACH, transmitted the transmission delay estimation information to the radio communication network system 1, each of the communication apparatuses $2_1$ to $2_3$ transmits the transmission delay estimation information to the radio communication network system 1 when it meets the transmission delay estimation information transmission condition in the present invention.

Figure 2:
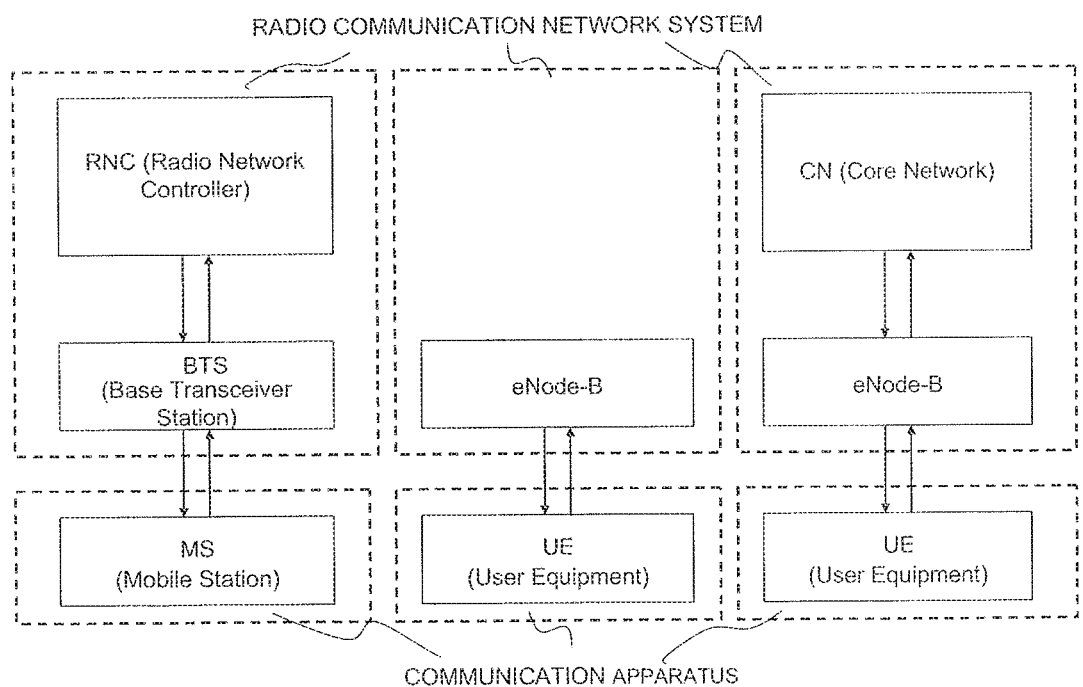
FIG. 2 is a specific configuration diagram of a radio communication network system 1 and communication apparatuses $2_1$ to $2_3$.

Herein, upon paying attention to a specific configuration of the radio communication network system 1 and the communication apparatuses $2_1$ to $2_3$, for example, with the case of the 3GPP, the radio communication network system 1 corresponds to RNC (Radio Network Controller) and BTS (Base Transceiver Station), and the communication apparatuses $2_1$ to $2_3$ corresponds to MS (Mobile Station) as shown in FIG. 2. Further, the radio communication network system 1 corresponds to eNode-B, and the communication apparatuses $2_1$ to $2_3$ correspond to UE (User Equipment) in some cases. Further, the radio communication network system 1 corresponds to CN (Core Network) and eNode-B, and the communication apparatuses $2_1$ to $2_3$ correspond to UE (User equipment) in some cases.

Figure 3:
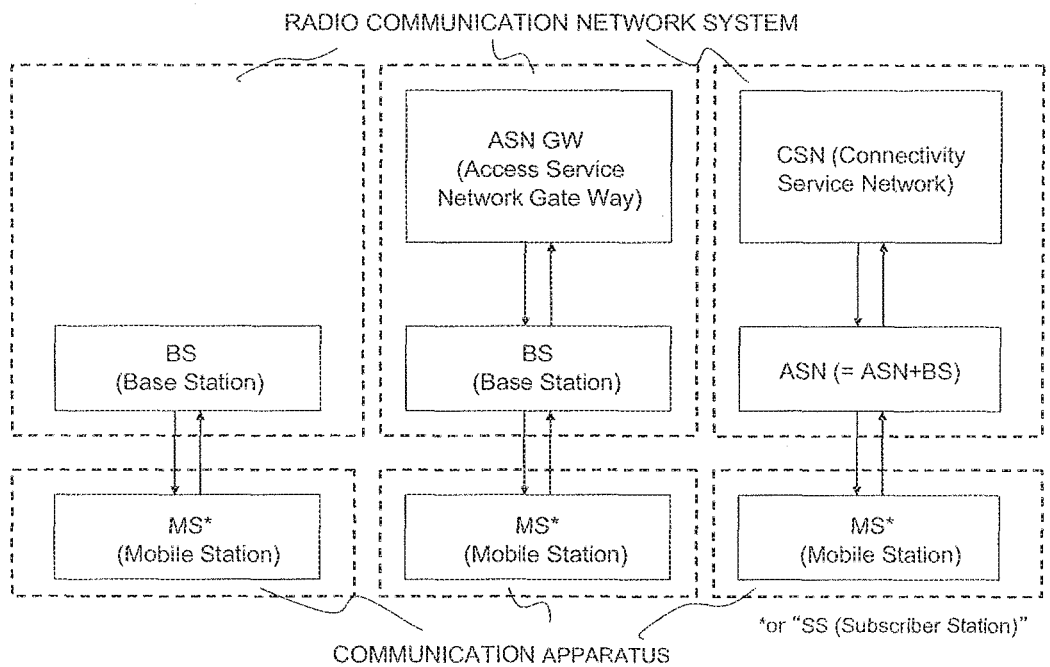
FIG. 3 is a specific configuration diagram of the radio communication network system 1 and the communication apparatuses $2_1$ to $2_3$.

With the case of WiMAX, the radio communication network system 1 corresponds to BS (Base Station), and the communication apparatuses $2_1$ to $2_3$ correspond to MS (Mobile Station) as shown in FIG. 3. Further, the radio communication network system 1 corresponds to ASN GW (Access Service Network Gate Way) and BS (Base Station), and the communication apparatuses $2_1$ to $2_3$ correspond to MS (Mobile Station) in some cases. Further, the radio communication network system 1 corresponds to CSN (Connectivity Service Network) and ASN(=ASN+BS), and the communication apparatuses $2_1$ to $2_3$ correspond to MS (Mobile Station) in some cases.

Figure 4:
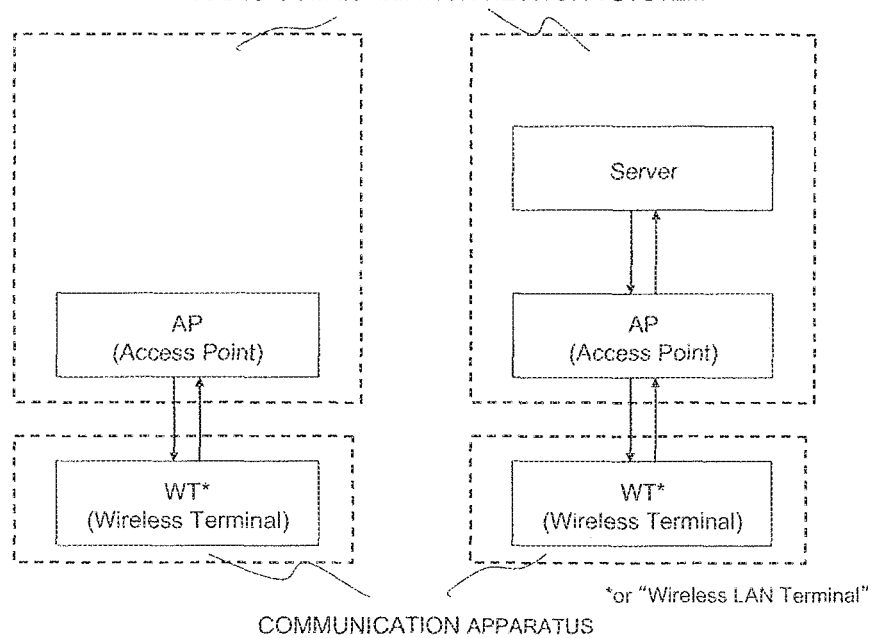
FIG. 4 is a specific configuration diagram of the radio communication network system 1 and the communication apparatuses $2_1$ to $2_3$.

With the case of wireless LAN, the radio communication network system 1 corresponds to AP (Access Point), and the communication apparatuses $2_1$ to $2_3$ correspond to WT (Wireless Terminal) as shown in FIG. 4. Further, the radio communication network system 1 corresponds to Server and AP (Access Point), and the communication apparatuses $2_1$ to $2_3$ correspond to WT (Wireless Terminal) in some cases.

Additionally, in the following explanation, the radio communication network system 1 is defined as the base station, and each of the communication apparatuses $2_1$ to $2_3$ is defined as the mobile station.

Herein, upon paying attention to a timing at which the transmission delay estimation information transmission condition is collated, as described in the related art, the transmission delay estimation information transmission condition may be collated irrespective of the reception of the acknowledgment signal when the access signal (the data, the preamble, or the like) is transmitted, and the transmission delay estimation information transmission condition may be collated after the acknowledgment signal is received, and further the timing of the collation is not limited hereto. That is, the transmission delay estimation information is transmitted when the transmission delay estimation information transmission condition is met in the system of transmitting the transmission delay estimation information in the case of transmitting the access signal (the data, the preamble, or the like) irrespectively of the acknowledgment signal. Further, the transmission delay estimation information is transmitted after it is determined that the acknowledgment signal has been received, and yet when the transmission delay estimation information transmission condition is met in the system of transmitting the transmission delay estimation information after receiving the acknowledgment signal.

Further, the so-called the transmission delay estimation information is, for example, the number of times of transmission or the number of times of retransmission of the access signal (the data, the preamble, or the like), a time elapsed since the initial transmission of the access signal, a timing of the initial transmission of the access signal, a back-off period required for transmitting the access signal, a value obtained by deducting the back-off period from a period required for transmitting the access signal, the number of times of power ramping required for transmitting the access signal, the number of times of power ramping cycle required for transmitting the access signal, or the like.

Additionally, the above-mentioned value of the transmission delay estimation information could be an actual value itself, and a table indicative of an index corresponding to a threshold is prepared in advance and the value of the transmission delay estimation information may be notified by use of the above index.

Further, the so-called transmission delay estimation information transmission condition is a condition associated with the number of times of retransmission or the number of times of transmission of the access signal required until the confirmation response to transmission of the above access signal from the communication apparatus to the radio communication network system is received, a time elapsed until the confirmation response to transmission of the above access signal is received, a transmission power of the above access signal, a path loss or a reception quality of the signal from the radio network system to the communication apparatus, a probability of a target to which the transmission delay estimation information is transmitted, identification information of the communication apparatus, a traffic of the above access signal, an application of the above access signal, a time elapsed until the acknowledgment signal is received since the transmission of the access signal (for example, until the RACH is received since the initial transmission of the RACH), or the like.

For example, suppose that the transmission delay estimation information transmission condition is that the number of times of retransmission of the access signal required until the acknowledgment signal is received is four or more. At this time, when the number of times of retransmission of the access signal is five with the communication apparatus $2_1$, the number of times of retransmission of the access signal is two with the communication apparatus $2_2$, and the number of times of retransmission of the access signal is four with the communication apparatus $2_3$, then each of the communication apparatus $2_1$ and the communication apparatus $2_3$ transmits the transmission delay estimation information to the radio communication network system 1 because each of them meets the transmission delay estimation information transmission condition that the number of times of retransmission of the access signal required until the acknowledgment signal is received is four or more. However, the communication apparatus $2_2$ does not transmit the transmission delay estimation information to the radio communication network system 1 because it does not meet the transmission delay estimation information transmission condition.

While conventionally, all of the communication apparatuses $2_1$ to $2_3$ transmit the transmission delay estimation information at a time point of having received the acknowledgment signal (ACK signal), the communication apparatus $2_1$ and the communication apparatus $2_3$, which meet the transmission delay estimation information transmission condition, transmit the transmission delay estimation information to the radio communication network system 1 in this invention. That is, the wireless resources for transmitting the transmission delay estimation information can be reduced to two thirds as compared with the conventional case.

Additionally, the transmission delay estimation information transmission condition may be preset to each communication apparatus, and a configuration may be made so that the radio communication network system 1 transmits the condition to the communication apparatus and the communication apparatus sets the condition. The communication apparatus notifies the radio communication network system of the utilized transmission delay estimation information transmission condition simultaneously with the transmission delay estimation information or separately from it when a plurality of the transmission delay estimation information transmission conditions are specified and are preset to each communication apparatus and each communication apparatus utilizes not all of them but one or more.

Further, upon paying attention to the communication apparatus to which the transmission delay estimation information transmission condition is applied, the transmission delay estimation information transmission condition may be commonly applied to all of the communication apparatuses that the radio communication network system 1 manages, may be commonly applied only to the communication apparatuses meeting a certain condition, and may be separately applied to the communication apparatuses that the radio communication network system 1 designates.

Hereinafter, the embodiment will be explained in details. Additionally, this embodiment will be described assuming that the system is a system now under consideration in the 3GPPLTE.

Figure 5:
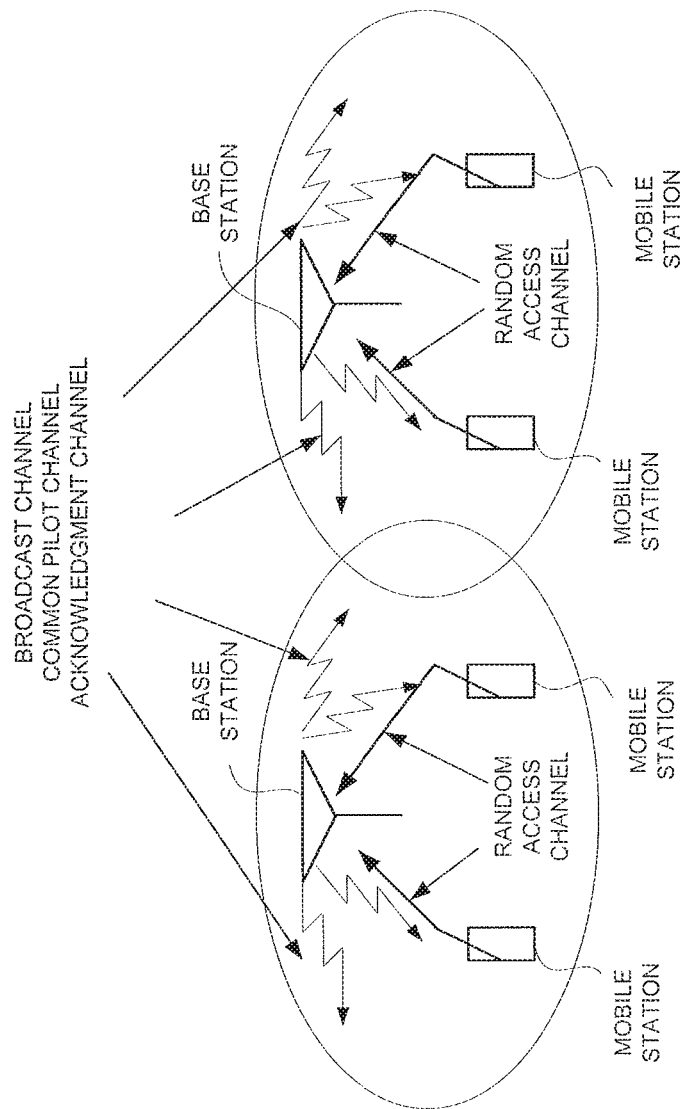
FIG. 5 is a conceptual diagram of the system to which the present invention is applied.

FIG. 5 is a conceptual diagram to which the present invention is applied. In this system, a plurality of the base stations are present adjacently to one another, a plurality of the mobile stations transmit or receive data on the downlink or the uplink to or from each of the base stations, OFDM (Orthogonal Frequency Division Multiple Access) is used for the down link, and SC-FDMA is used for the uplink. Additionally, while it is assumed that the SC-FDMA is used for the uplink herein, the OFDM is also applicable. Furthermore, each of the mobile stations and base stations realize functions to be described below by a control program stored in a memory of each of the mobile stations and base stations.

Figure 6:
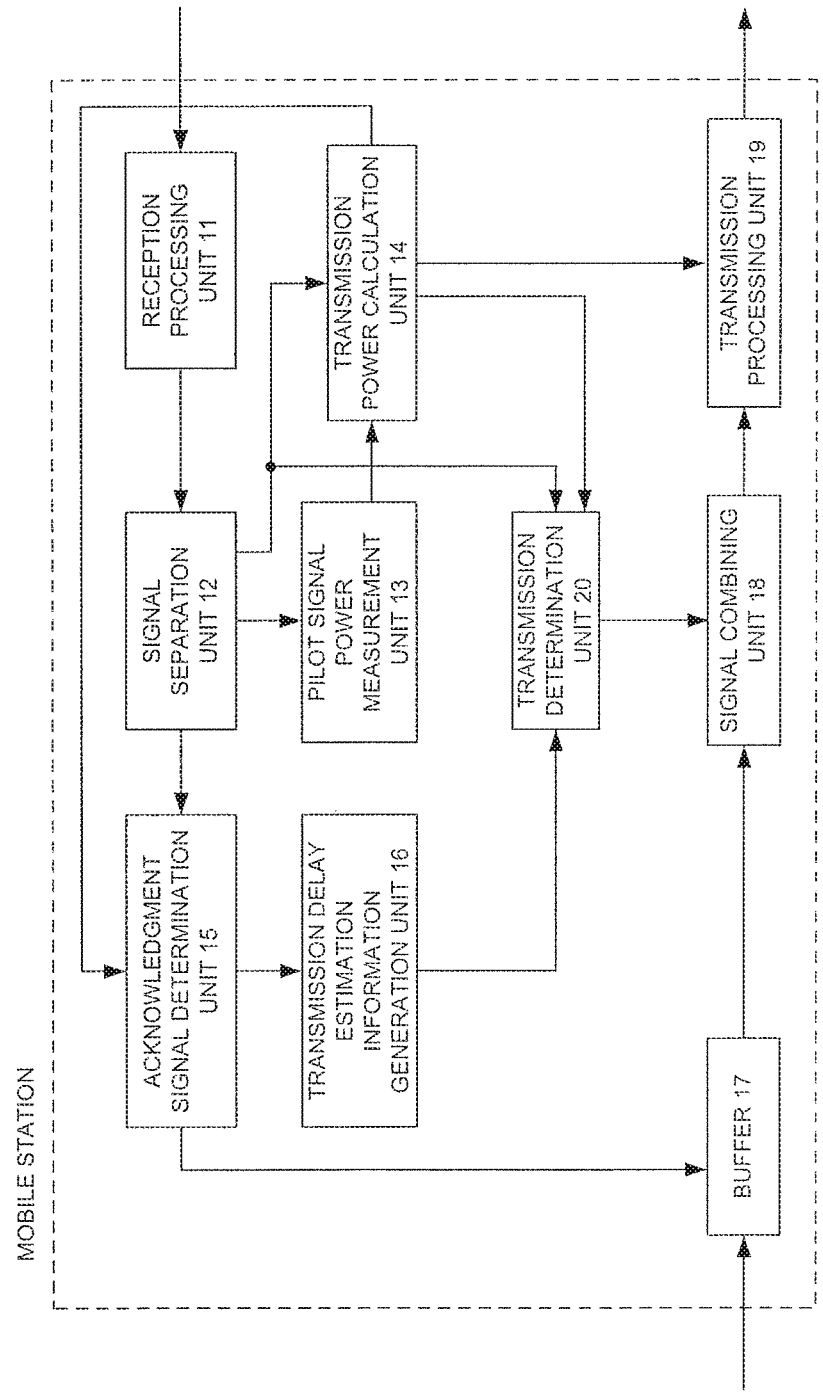
FIG. 6 is a configuration diagram of the mobile station in this embodiment.

The base station transmits on the down link at least a broadcast channel for transmitting the broadcast information such as the system information, a common pilot channel for transmitting the pilot signal (also referred to as reference signal), and a common channel for transmitting the acknowledgment information etc. in response to uplink data transmission Next, a configuration of the mobile station in the system mentioned above is shown in FIG. 6.

The mobile station of this embodiment is configured to include a reception processing unit 11 for receiving a downlink signal and performing a necessary reception process such as FFT (Fast Fourier Transform), a signal separation unit 12 for separating signals in respective channels from the received signal, a pilot signal measurement unit 13 for measuring a power intensity of the separated pilot signal, a transmission power calculation unit 14 for calculating a transmission power of the random access channel, an acknowledgment signal determination unit 15 for determining the acknowledgment signal received over the common channel, a transmission delay estimation information generation unit 16 for generating the transmission delay estimation information, a buffer 17, a signal combining unit 18 for combining the uplink data with the control signal, a transmission processing unit 19 for performing a process necessary for transmitting the signal, and a transmission determination unit 20 for determining the transmission delay estimation information transmission condition.

The signal separation unit 12 separates signals in respective channels from the signal subjected to the reception process, and transmits the signal of the common pilot channel to pilot signal measurement unit 13, the signal of the common pilot channel to the acknowledgment signal determination unit 15, and the signal of the broadcast channel to the power calculation unit 14.

The pilot signal measurement unit 13 measures an average reception power of the pilot signal in a predetermined cycle, and transmits a measurement result to the transmission power calculation unit 14.

The transmission power calculation unit 14 calculates a transmission power of the random access channel from the transmission power of the common pilot channel notified by the broadcast channel, the power offset, and the average reception power of the pilot signal, and notifies the transmission processing unit 19 of a calculation result.

The acknowledgment signal determination unit 15 determines whether the acknowledgment signal is received as acknowledgment information, and notifies the transmission delay estimation information generation unit 16 and the buffer 17 of a determination result.

The transmission delay estimation information generation unit 16 generates the fixed transmission delay estimation information (the number of times of transmission or the number of times of retransmission of the access signal and the like), and notifies the transmission determination unit 20 of it.

The transmission determination unit 20 determines whether the mobile station meets the transmission delay estimation information transmission condition, and transmits a determination result to the signal combining unit 18 when it meets.

The buffer 17, upon receipt of the acknowledgment signal, destroys the corresponding data, and transmits the corresponding data to the signal combining unit 18 when it does not receive.

The signal combining unit 18 combines the data transmitted from the buffer with the number-of-times information of transmission, and transmits the resultant data to the transmission processing unit 19.

Figure 7:
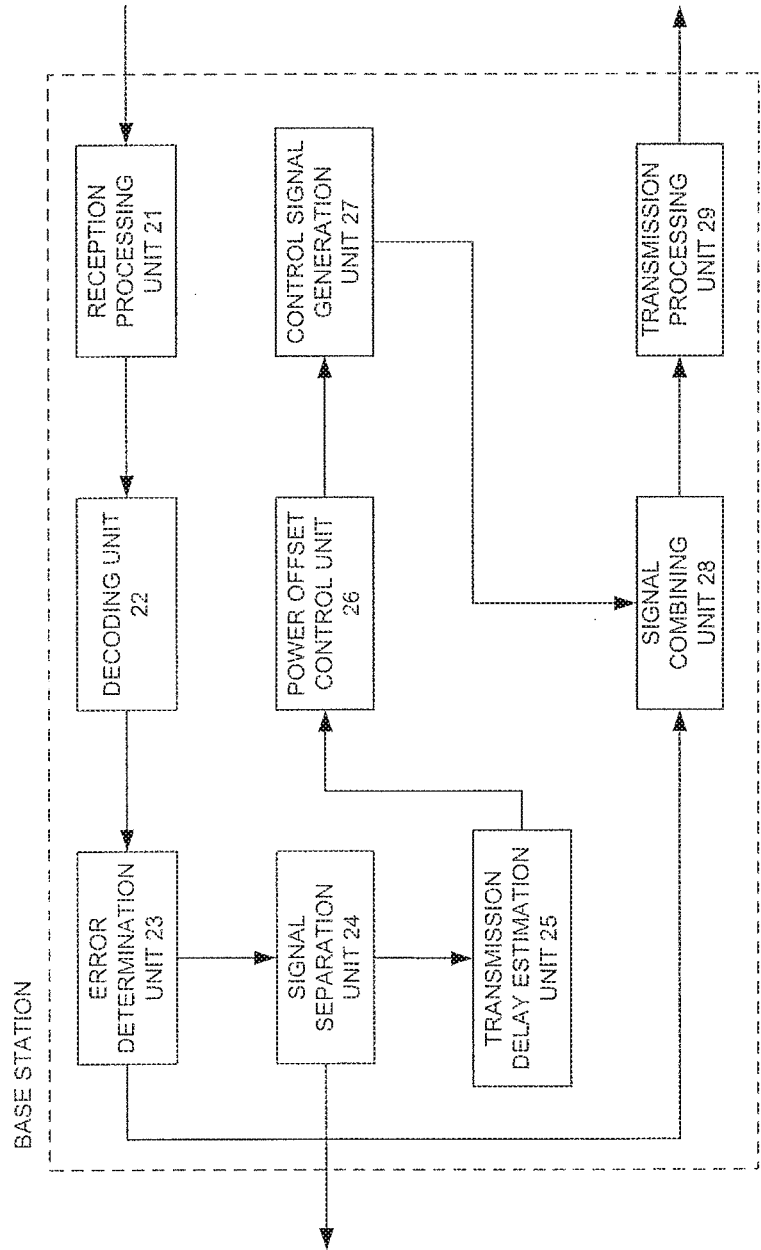
FIG. 7 is a configuration diagram of the base station in this embodiment.

Continuously, a configuration of the base station in the system mentioned above is shown in FIG. 7.

The base station of this embodiment is configured to include a reception processing unit 21, a decoding unit 22, an error determination unit 23, a signal separation unit 24 for separating the signal, a transmission delay estimation unit 25, a power offset control unit 26, a control signal generation unit 27, a signal combining unit 28, and a transmission processing unit 29.

The error determination unit 23 checks whether a data block including the data and the number-of-times information of transmission has no error by a CRC added to the data block, and transmits the acknowledgment signal to the signal combining unit 28 and the data block to the signal separation unit 24 when the base station can receive the data block without an error.

The signal separation unit 24 transmits the transmission delay estimation information to the transmission delay estimation unit 25, and the data to a higher layer.

The transmission delay estimation unit 25 collects the transmission delay estimation information of each mobile station, and records it in a memory not shown in the figure.

The power offset control unit 26 updates the power offset based upon the transmission delay estimation information, and transmits an update result to the signal combining unit 28.

The control signal generation unit 27 generates the common pilot signal and the signal associated with other system control information, and transmits the signals to the signal combining unit 28.

The signal combining unit 28 maps the transmitted signals on respective channels of the common pilot channel, the broadcast channel, and the common channel, code-multiplexes, spatially multiplexes, time-multiplexes, and frequency-multiplexes them, and transmits them to the transmission processing unit 29.

Additionally, while the transmission delay estimation information is employed for controlling the transmission power offset of the RACH in this embodiment, the transmission delay estimation information can be utilized for the control of a transmission parameter of the RACH besides it, for example, the control of a back-off parameter of the RACH.

Figure 8:
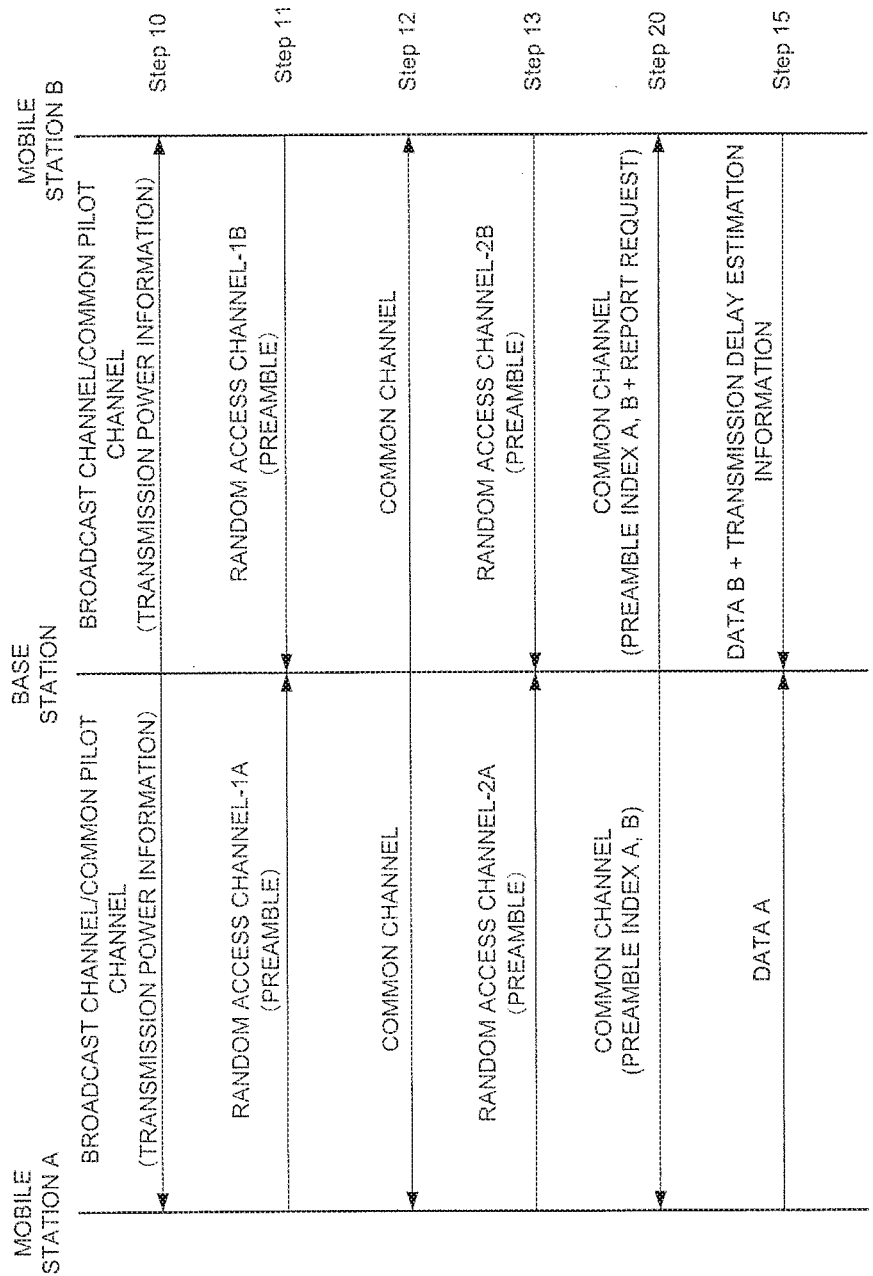
FIG. 8 is a sequence diagram in the case of commonly applying a transmission delay estimation information transmission condition to all of the mobile station.

Continuously, an operation between the mobile station and the base station in the system mentioned above will be explained. FIG. 8 is a sequence diagram in the case of commonly applying the transmission delay estimation information transmission condition to all of the mobile stations in the above-mentioned system.

At first, the mobile station transmits or receives data based upon the system information transmitted over the broadcast channel. Further, the mobile station receives the common pilot channel in a predetermined cycle to ensure synchronization of the downlink and measures a reception quality of the common pilot channel (Step 10).

When the user data or the control signal (hereinafter, they are called data together) to be transmitted occurs to the mobile station, the mobile station transmits the preamble using the random access channel that is one of the wireless channels (Step 11). At this time, the transmission power of the random access channel is decided based upon a value indicated by the base station using the broadcast channel.

The base station notifies of the index (acknowledgment signal) of the correctly received preamble by the common channel (Step 12 and Step 14).

When the mobile station transmits the preamble over the random access channel, the mobile station receives the acknowledgment signal indicating that the preamble transmitted by its own station has been correctly received by an RA response including the acknowledgment signal over the common channel after a predetermined time, or retransmits the preamble in a predetermined timing until a predetermined maximum number of times of transmission is reached (Step 13). And, after receiving the acknowledgment signal, the mobile station transmits the data or the control signal according to the random access response (RA Response) that is transmitted over the common channel. At this time, the present invention determines whether the mobile station satisfies the transmission condition of the transmission delay estimation information. When the mobile station satisfies, the above mobile station transmits the transmission delay estimation information together with the data or the control signal to the base station (step 15). When the mobile station does not satisfy the transmission delay estimation information transmission condition, the above mobile station transmits only the data or the control signal to the base station (step 15).

Additionally, a sequence diagram of FIG. 8 shows a situation in which a mobile station A, which satisfies the transmission delay estimation information transmission condition, transmits the transmission delay estimation information together with the data to the base station, and on the other hand, the mobile station B, which does not satisfy the transmission delay estimation information transmission condition, transmits only the data to the base station.

Figure 9:
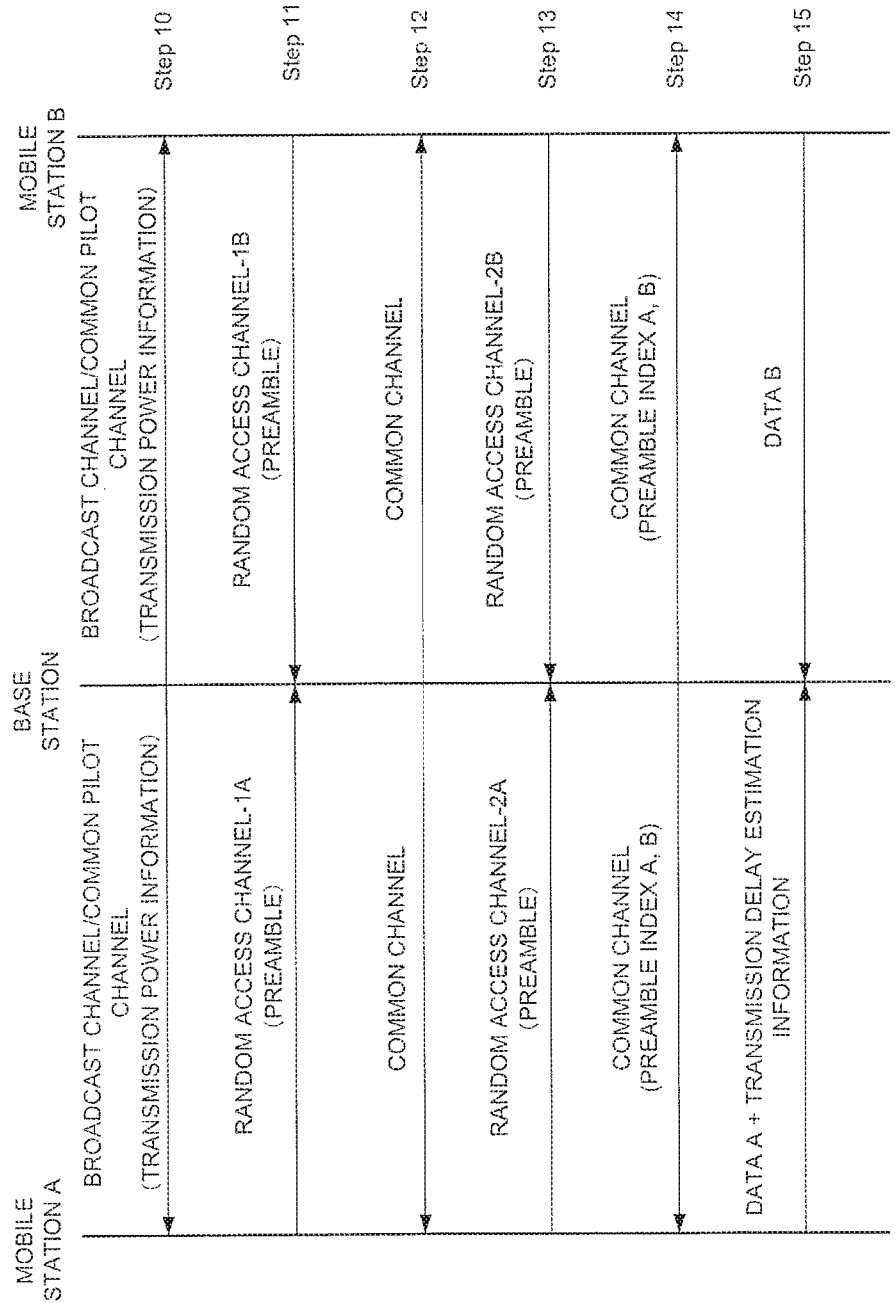
FIG. 9 is a sequence diagram in the case of separately/selectively applying the transmission delay estimation information transmission condition to the mobile stations.

Next, the case of separately/selectively applying the transmission delay estimation information transmission condition to the mobile stations will be explained. FIG. 9 is a sequence diagram in the case of separately/selectively applying the transmission delay estimation information transmission condition to the mobile stations in the above-mentioned system.

A point in which the sequence diagram of FIG. 9 differs from that of FIG. 8 is that when the base station correctly receives the preamble, the base station transmits a report request (Report request) together with the acknowledgment signal to the mobile stations to which the transmission delay estimation information transmission condition is applied by using the RA Response that is transmitted over the common channel (Step 20), and the mobile station having received this judges whether it meets the transmission delay estimation information transmission condition, and transmits the transmission delay estimation information together with the data to the base station when it meets (Step 15).

Additionally, the Report request in the case of the separate control is not always transmitted by using the RA Response, and it may be notified by using the downlink signal that is transmitted from base station to the mobile station thereafter. For example, the downlink signal for Contention Resolution adopted for the LTE, the downlink signal after the Contention Resolution, or the like is thinkable.

Figure 10:
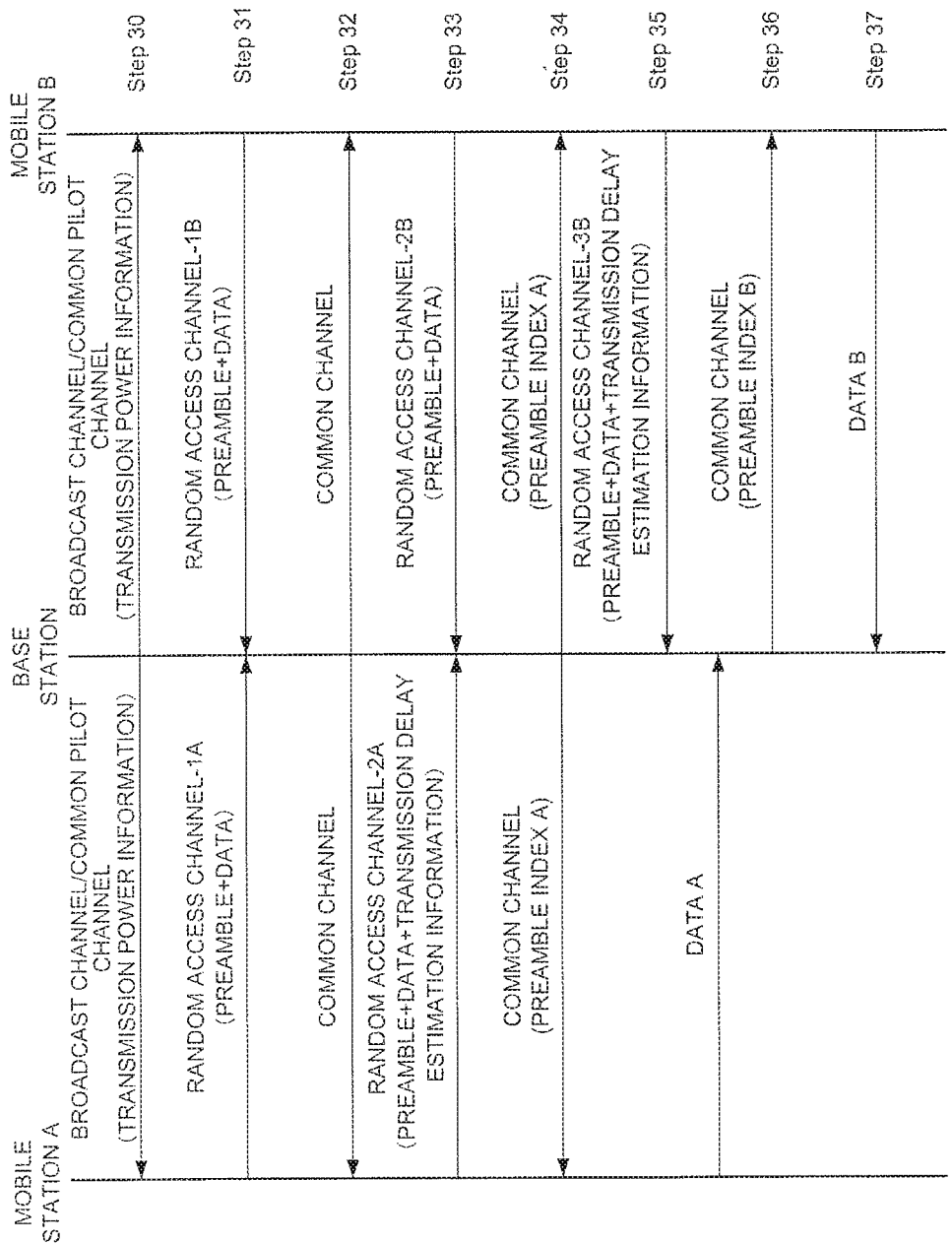
FIG. 10 is another sequence diagram in the case of commonly applying the transmission condition of the transmission delay estimation information to all of the mobile station.

FIG. 10 is a sequence diagram in the case of commonly applying the transmission delay estimation information transmission condition to all of the mobile stations. A point in which the sequence of FIG. 10 differs from the sequences of FIG. 8 and FIG. 9 mentioned above is that the mobile station, which meets the transmission delay estimation information transmission condition, transmits the transmission delay estimation information irrespectively of the reception of the acknowledgment signal.

At first, the mobile station transmits or receives the data based upon the system information transmitted over the broadcast channel. Further, the mobile station receives the common pilot channel in a predetermined cycle to ensure synchronization and measures a reception quality of the common pilot channel (Step 30).

When the user data or the control signal to be transmitted occurs, each of the mobile stations A and B transmits the data and the preamble by using the random access channel that is one of the wireless channels (Step 3-1). At this time, each of the mobile stations A and B transmits the transmission delay estimation information as well when it meets the transmission delay estimation information transmission condition.

Each of the mobile stations A and B retransmits the preamble in a predetermined timing until it receives the acknowledgment signal (its own station's preamble index) indicating that the preamble transmitted by its own station has been correctly received by the RA Response that is transmitted over the common channel after a predetermined time (Step 32 and Step 33).

Herein, the mobile station A, which has already met the transmission delay estimation information transmission condition at the time of the second-time transmission of the preamble, transmits the transmission delay estimation information together with the data and the preamble to the base station (Step 33). On the other hand, the mobile station B, which has not met the transmission delay estimation information transmission condition yet at the time of the second-time transmission of the preamble, transmits only the data and the preamble to the base station (Step 33).

The base station notifies of the index (acknowledgment signal) of the correctly received preamble by the common channel (Step 32 and Step 34).

The mobile station A, upon receipt of the index of its own station's preamble, transmits the data to the base station (Step 35). On the other hand, the mobile station B, which was not able to receive the index of its own station's preamble, executes the third-time transmission of the preamble, and the mobile station B transmits the transmission delay estimation information together with the data and the preamble to the base station because it has met the transmission delay estimation information transmission condition at the time of the third-time transmission of the preamble (Step 35).

The mobile station B, upon receipt of the index of its own station's preamble (Step 36), transmits the data to the base station (Step 37).

Additionally, the transmission delay estimation information transmission condition is commonly applied to all of the mobile stations in the example of FIG. 10 mentioned above, and the situation is similar with the case of the separate application like FIG. 9. In this case, the base station transmits the report request (Report request) by using the RA Response that is transmitted over the common channel, and the mobile station having received the request transmits the transmission delay estimation information when it meets the transmission delay estimation information transmission condition.

Figure 11:
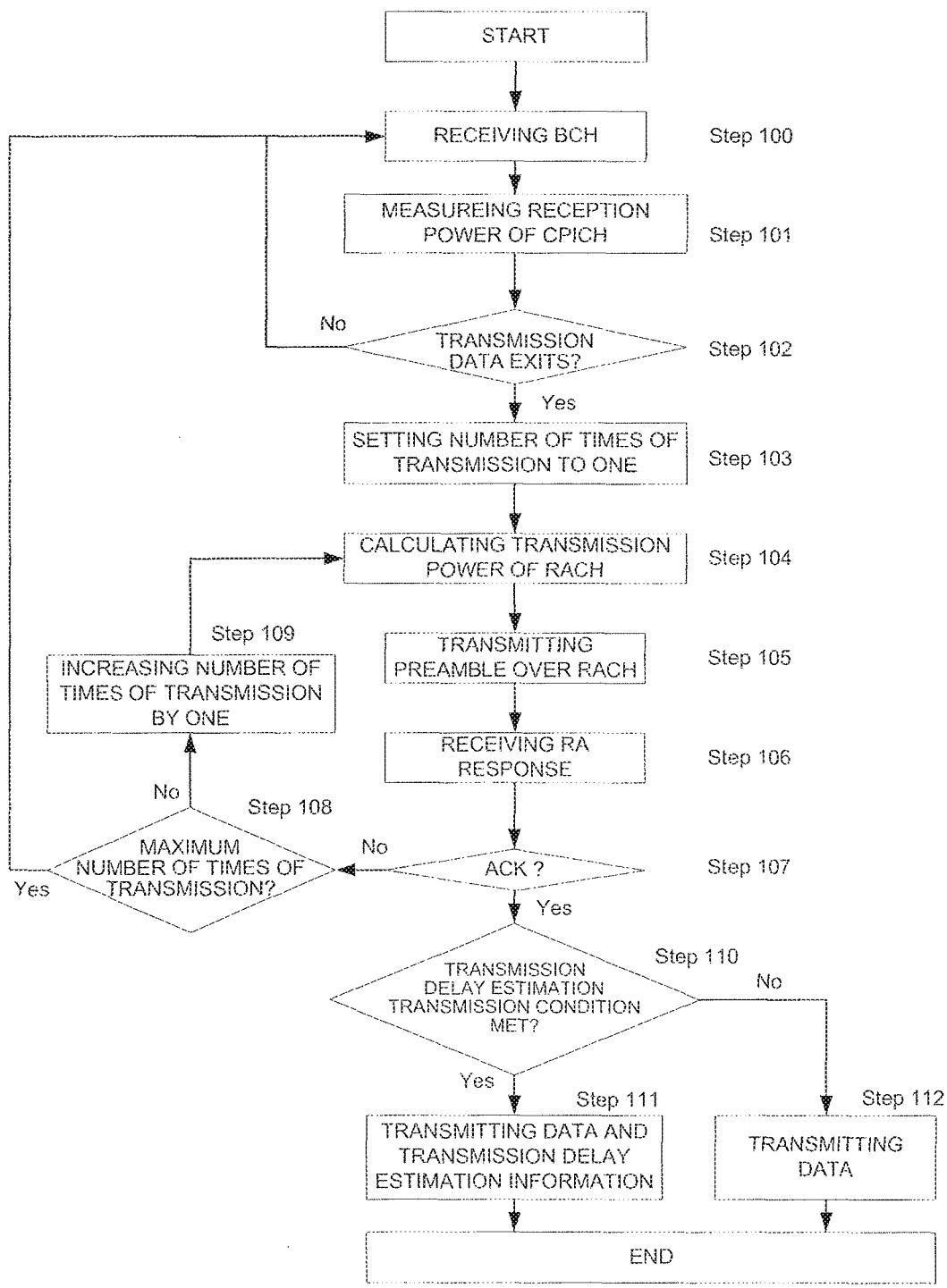
FIG. 11 is an operational flowchart of the mobile station in this embodiment.

Next, an operation of the mobile station in this embodiment will be explained. In this operation, after the mobile station receives the acknowledgment signal, it is determined whether the mobile station meets the transmission condition of the transmission delay estimation information. FIG. 11 is an operational flowchart of the mobile station in this embodiment.

The mobile station receives the system information that is transmitted over the broadcast channel (Step 100), receives the common pilot channel in a predetermined cycle to ensure synchronization of the downlink signal, and measures a reception quality of the common pilot channel (Step 101).

When the data to be transmitted occurs to the mobile station, the mobile station sets the number of times of transmission to one (1) (Step 103) and calculates the transmission power of the RACH (Step 104). And the mobile station transmits the preamble over the RACH (Step 105).

The mobile station receives the RA Response that is transmitted over the common channel after a predetermined time (Step 106), and determines whether the acknowledgment signal has been received (Step 107). When the mobile station cannot receive the acknowledgment signal, the mobile station determines whether the number of times of transmission of the preamble is a maximum number of times of transmission (Step S108). When the number of times of transmission is a maximum number of times of transmission, the operation returns to the Step 100. When the number of times of transmission is not a maximum number of times of transmission, the mobile station adds one (1) to the number of times of transmission (Step 109), and the operation returns to the Step 104.

On the other hand, when the mobile station receives the acknowledgment signal, it is determined whether the mobile station meets the transmission condition of the transmission delay estimation information (Step 110). When the mobile station has met the transmission condition of the transmission delay estimation information, the mobile station transmits the transmission delay estimation information together with the data to the base station (Step 111). Further, when the mobile station has not met the transmission condition of the transmission delay estimation information, the mobile station transmits only the data to the base station (Step 112).

Figure 12:
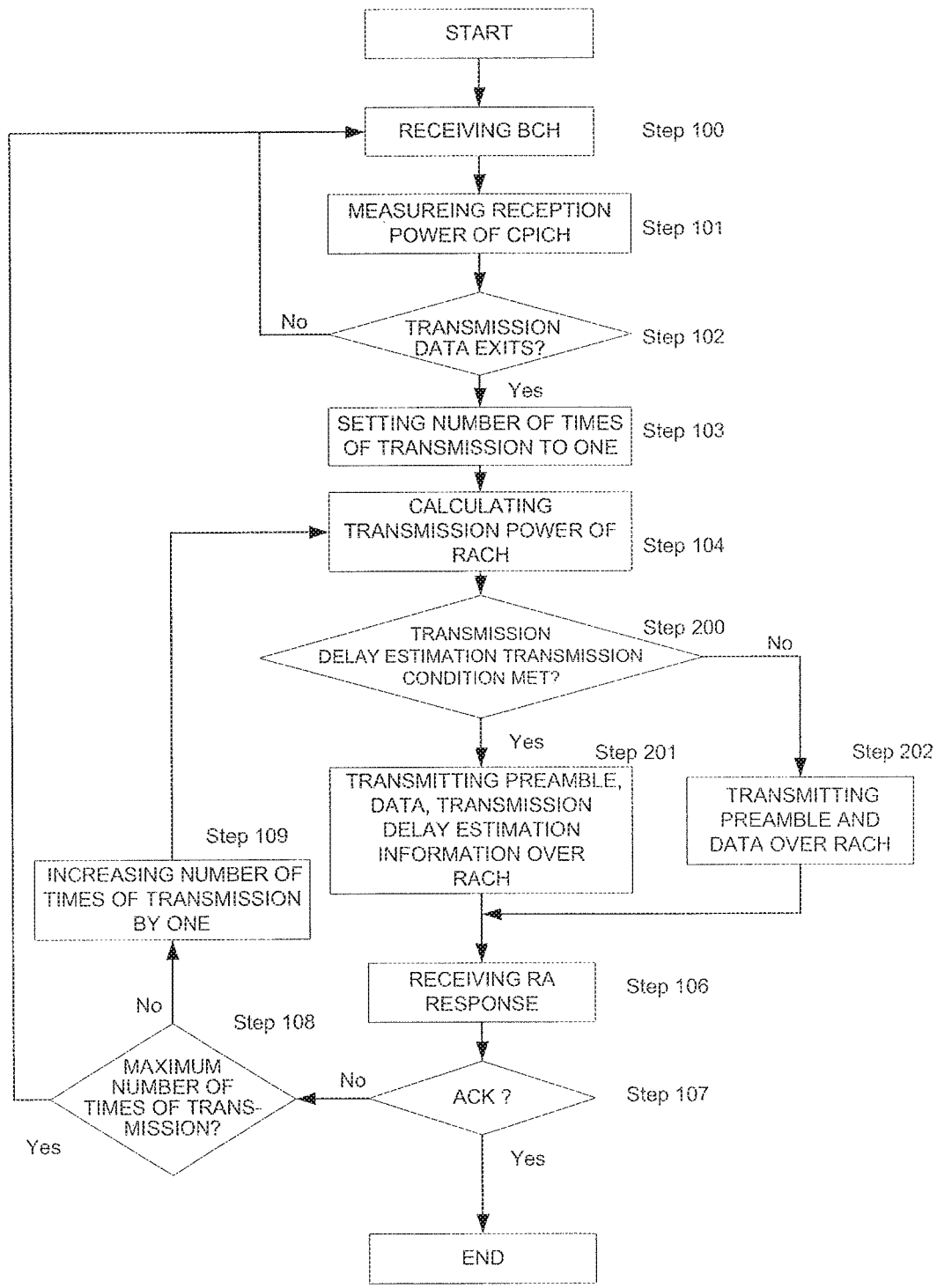
FIG. 12 is another operational flowchart of the mobile station in this embodiment.

Continuously, another operation of the mobile station in this embodiment will be explained. In this operation, it is determined whether the mobile station meets the transmission condition of the transmission delay estimation information at the time of transmitting the preamble of the RACH notwithstanding the reception of the acknowledgment signal. FIG. 12 is another operational flowchart of the mobile station in this embodiment.

A point in which FIG. 12 differs from FIG. 11 is that it is determined whether the mobile station meets the transmission condition of the transmission delay estimation information (Step 200) after calculating the transmission power of the RACH (Step 104), and yet before transmitting the preamble over the RACH (Step 105). And, the mobile station, which has already met the transmission condition of the transmission delay estimation information, transmits the transmission delay estimation information together with the preamble and the data to the base station (Step 201). On the other hand, the mobile station, which has not met the transmission condition of the transmission delay estimation information yet, transmits only the preamble and the data to the base station (Step 202).

The other steps of FIG. 12 are similar to those of FIG. 11, so its explanation is omitted.

Figure 13:
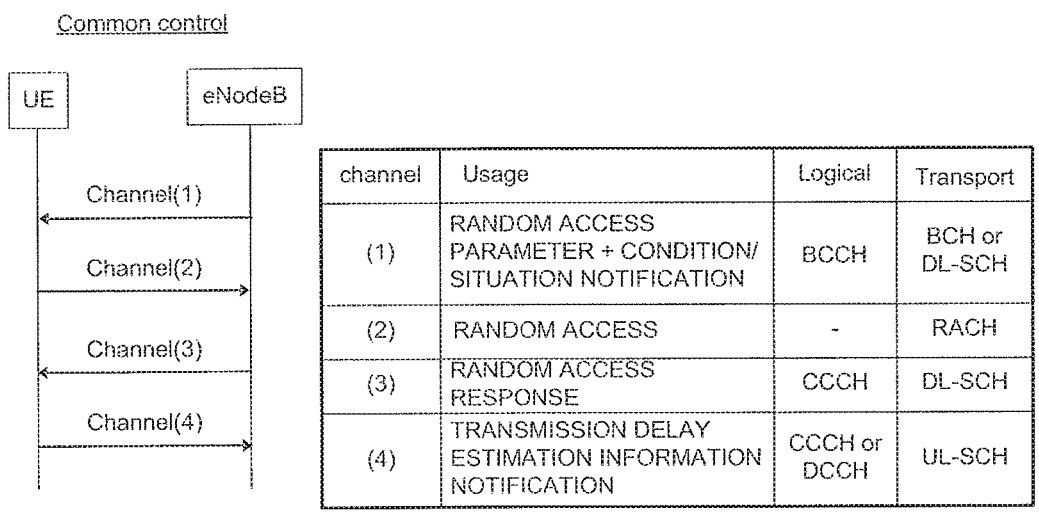
FIG. 13 is a diagram for explaining a correspondence between each channel of this embodiment and each channel of the 3GPP LTE system.

Additionally, in the foregoing explanation, each channel was described by using general names, and a specific channel between UE (mobile station) and eNodeB (base mobile) in the system of 3GPP LTE is shown in FIG. 13.

That is, the broadcast channel for making a notification of the random access parameter, the condition, and the situation from eNodeB (base mobile) to UE (mobile station) is BCCH with Logical layer, BCH or DL-SCH with Transport layer. Further, the channel for making a random access from the UE (mobile station) to the eNodeB (base mobile) is RACH with the Transport layer. Further, the channel for making a random access response from the eNodeB (base mobile) to the UE (mobile station) is CCCH with the Logical layer, and is DL-SCH with the Transport layer. Further, the channel for making a notification of the transmission delay estimation information from the UE (mobile station) to the eNodeB (base mobile) is CCCH or DCCH with the Logical layer, and is UL-SCH with Transport layer.

Additionally, while each unit of the foregoing mobile station and base station is configured with hardware, one part or the entirety thereof can be configured with CPU that operates under a program.

Next, specific examples of the present invention will be explained.

EXAMPLE 1

In the example 1, the case that the transmission delay estimation information transmission condition is the number of times of transmission of the access signal that is performed by the mobile station, and is notified by the broadcast channel will be explained. Additionally, in the following explanation, the case that the mobile station transmits the transmission delay estimation information when the number of times of transmission of the access signal by the mobile station is larger than N=4 or is less than M=2 after receiving the acknowledgment is exemplified.

Figure 14:
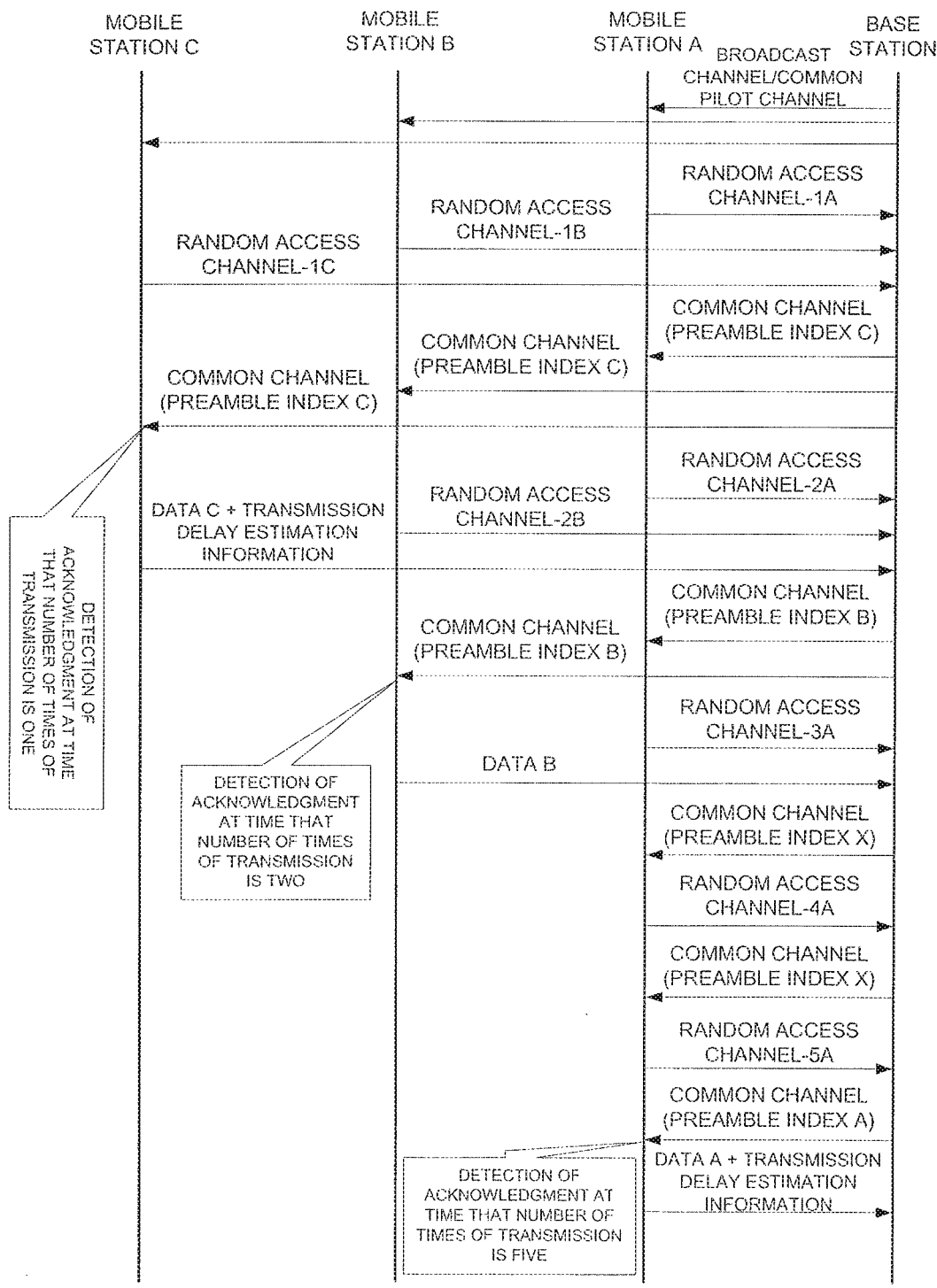
FIG. 14 is a diagram for explaining an example 1.

FIG. 14 is a diagram for explaining the example 1.

At first, the base station transmits the broadcast channel and the common pilot channel to the mobile stations A, B, and C.

When the data to be transmitted occurs, the mobile stations A, B, and C transmit the preamble using the random access channel that is one of the wireless channels.

The base station notifies of the index (acknowledgment signal) of the correctly received preamble by the common channel. At this time, the mobile station C meets the transmission delay estimation information transmission condition that the number of times of transmission is larger than N=4 or is less than M=2 because the acknowledgment has been detected at the time that the number of times of transmission of the preamble is one (1). Thereupon, the mobile station C transmits the transmission delay estimation information to the base station.

The mobile stations A and B, which cannot obtain the acknowledgment, transmit the preamble over the random access channel. Then, the mobile station B does not meet the transmission delay estimation information transmission condition that the number of times of transmission is larger than N=4 or is less than M=2 because the acknowledgment has been detected at the time that the number of times of transmission of the preamble is two. Thus, the mobile station B does not transmit the transmission delay estimation information to the base station.

The mobile stations A, which cannot obtain the acknowledgment, transmit the preamble over the random access channel. Then, the mobile station A meets the transmission delay estimation information transmission condition that the number of times of transmission is larger than N=4 or is less than M=2 because the acknowledgment has been detected at the time that the number of times of transmission of the preamble is five. Thereupon, the mobile station A transmits the transmission delay estimation information to the base station.

In such a manner, the number of the mobile stations, which transmit the transmission delay estimation information, can be reduced to two thirds as compared with the conventional case that all of the mobile stations transmit the transmission delay estimation information.

EXAMPLE 2

In the example 2, the case that the transmission delay estimation information transmission condition is the number of times of transmission of the access signal that is performed by the mobile station, and is notified by the broadcast channel, and yet that the target mobile station is a mobile station having received the Report request, being a separate control, will be explained. Additionally, in the following explanation, the case that the mobile station, which has the number of times of transmission of the access signal larger than N=4 or less than M=2 after receiving the acknowledgment, and yet has received the Report request, transmits the transmission delay estimation information is exemplified.

Figure 15:
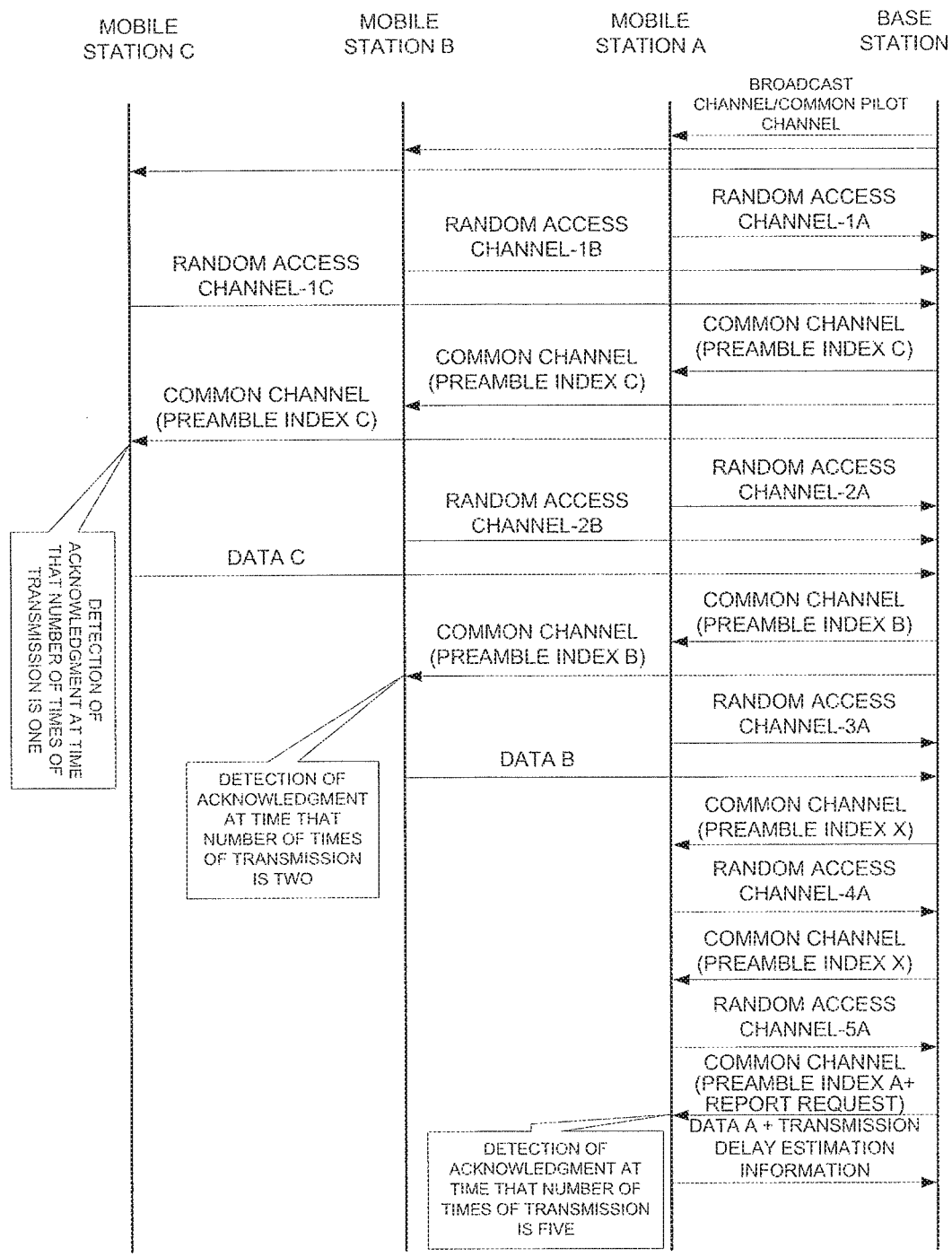
FIG. 15 is a diagram for explaining an example 2.

FIG. 15 is a diagram for explaining the example 2.

At first, the base station transmits the broadcast channel and the common pilot channel to the mobile stations A, B, and C.

When the data to be transmitted occurs, the mobile stations A, B, and C transmit the preamble using the random access channel that is one of the wireless channels.

The base station notifies of the index (acknowledgment signal) of the correctly received preamble by the common channel. At this time, the mobile station C has the number of times of transmission larger than N=4 or less than M=2 because the acknowledgment has been detected at the time that the number of times of transmission of the preamble is one (1), but has not received the Report request. Thereupon, the mobile station C does not transmit the transmission delay estimation information to the base station.

The mobile stations A and B, which cannot obtain the acknowledgment, transmit the preamble over the random access channel. Then, the mobile station B does not meet the transmission delay estimation information transmission condition that the number of times of transmission is larger than N=4 or is less than M=2 because the acknowledgment has been detected at the time that the number of times of transmission of the preamble is two. Thus, the mobile station B does not transmit the transmission delay estimation information to the base station.

The mobile station A, which cannot obtain the acknowledgment, transmits the preamble over the random access channel. Then, the mobile station A meets the transmission delay estimation information transmission condition because the mobile station A has the number of times of transmission larger than N=4 or less than M=2 due to the detection of the acknowledgment at the time that the number of times of transmission of the preamble is five, and yet received the Report request. Thereupon, the mobile station A transmits the transmission delay estimation information to the base station.

In such a manner, the number of the mobile stations, which transmit the transmission delay estimation information, can be reduced to two thirds as compared with the conventional case that all of the mobile stations transmit the transmission delay estimation information.

While it was assumed that the transmission delay estimation information transmission condition was notified by the broadcast channel in the example 2, there exists the method as well of notifying of it together with the Report request.

EXAMPLE 3

In the example 3, the case that the transmission delay estimation information transmission condition is the transmission power of the random access channel will be explained. Additionally, in the following explanation, the case of transmitting the transmission delay estimation information when the transmission power of the random access channel of the mobile station is less than a maximum value after receiving the acknowledgment is exemplified.

FIG. 16 is a diagram for explaining the example 3.

At first, it is assumed that when the transmission power of the random access channel of the mobile station is P_Tx, the transmission power P_Tx is controlled by the following equation.

$$P\_Tx=CPICH\_Tx\text{-}CPICH\_Rx+PO+\Delta P\times(\text{number of times of transmission}-1)[dBm]$$

Wherein CPICH_Tx is the transmission power of the common pilot channel, CPICH_Rx is the reception power of the common pilot channel, PO is the power offset, and $\Delta P$ is the ramping step size, and it is assumed that each of them is common to the mobile stations.

Herein, each of the mobile stations A and B increases the transmission power P_Tx by $\Delta P$ whenever it transmits the random access channel as shown in FIG. 16.

In this case, at the time of having received the acknowledgment, the transmission power P_Tx of the mobile stations A is the maximum transmission power. Thus, the mobile station A does not transmit the transmission delay estimation information to the base station because the mobile station A does not meet the transmission delay estimation information transmission condition that the transmission power of the random access channel of the mobile station is less than the maximum.

On the other hand, at the time that the mobile station B has received the acknowledgment, the transmission power P_Tx of the mobile stations B is less than the maximum transmission power. Thus, the mobile station B transmits the transmission delay estimation information to the base station because the mobile station B meets the transmission delay estimation information transmission condition that the transmission power of the random access channel of the mobile station is less than the maximum.

EXAMPLE 4

In the example 4, the case that the transmission delay estimation information transmission condition is a probability control utilizing a target probability P (P is a real number equal to or more than zero and less than 1) designated by the base station will be explained.

At first, when the mobile station transmits the random access channel, and receives the acknowledgment, the mobile station creates uniform distribution random numbers "rand" equal to or more than zero and less than 1. The mobile station transmits the transmission delay estimation information and the data to the base station when the "rand" is larger than the probability P, and otherwise transmits only the data without transmitting the transmission delay estimation information.

EXAMPLE 5

In the example 5, the case that the transmission delay estimation information transmission condition is a traffic amount of the preamble of the random access channel and whether or not to transmit the transmission delay estimation information is notified by the broadcast channel will be explained.

In this example, the base station monitors a traffic amount of the preamble of the random access channel, and instructs each mobile station to transmit the transmission delay estimation information by the broadcast channel when the traffic amount exceeds a predetermined threshold T.

Each mobile station, upon receipt of the instruction for transiting the transmission delay estimation information by the broadcast channel, transmits the transmission delay estimation information together with the data after receiving the acknowledgment signal.

Figure 17:
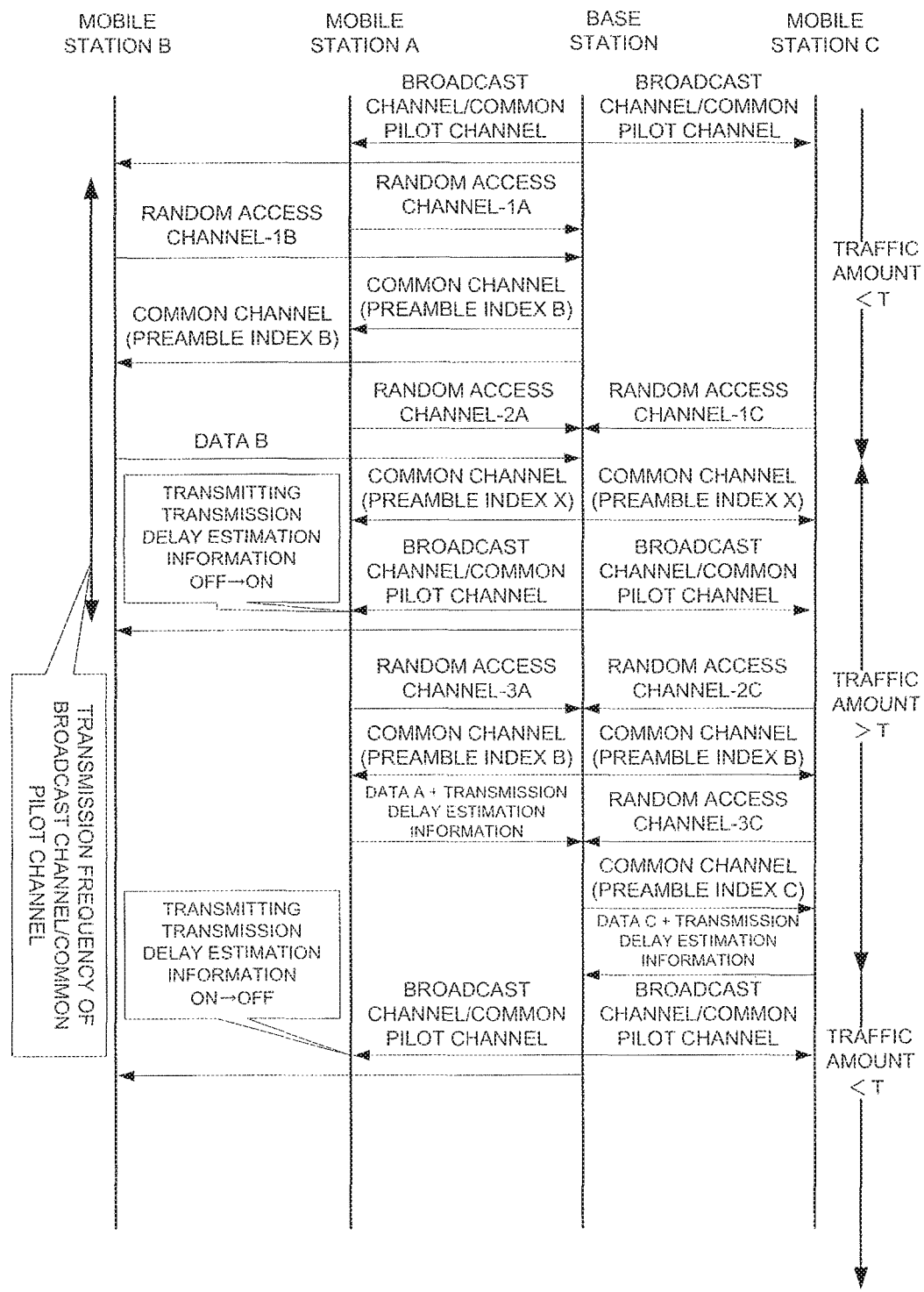
FIG. 17 is a diagram for explaining an example 5.

Next, a specific operation of the example 5 will be explained by employing FIG. 17. FIG. 17 is a sequence diagram illustrating an operation of the example 5.

At first, the base station transmits the broadcast channel and the common pilot channel to the mobile stations A, B, and C.

When the data to be transmitted occurs, the mobile stations A, B, and C transmit the preamble using the random access channel that is one of the wireless channels. In an example of FIG. 17, the mobile stations A and B transmit the preamble using the random access channel.

The base station monitors a traffic amount of the preamble of the random access channel, and the base station notifies of the index (acknowledgment signal) of the correctly received preamble by the common channel. In an example of FIG. 16, the mobile station A transmits the preamble over the random access channel again because it was not able to detect the acknowledgment signal. On the other hand, the mobile station B transmits the data because it was able to detect the acknowledgment. Further, the mobile station C transmits the preamble over the random access channel because the data to be transmitted has occurred. And, the base station was not able to detect the preamble of the mobile stations A and C, so the mobile stations A and C cannot detect the acknowledgment signal.

When the traffic amount exceeds a predetermined threshold T as a result of monitoring the traffic amount of the preamble of the random access channel, the base station instructs each mobile station to transmit the transmission delay estimation information by the broadcast channel. A instruction for transmitting the transmission delay estimation information or not is made with a transmission frequency of the broadcast channel or the integer multiples thereof.

The mobile station having received an instruction for transmitting the transmission delay estimation information by the broadcast channel transmits the transmission delay estimation information together with the data after receiving the acknowledgment signal. In an example of FIG. 17, the mobile stations A and B, which have received the acknowledgment signal after receiving the instruction for transmitting the transmission delay estimation information, transmits the transmission delay estimation information together with data.

When the traffic amount becomes smaller than a predetermined threshold T as a result of monitoring the traffic amount of the preamble of the random access channel, the base station notifies each mobile station that the transmission delay estimation information does not need to be transmitted by using the broadcast channel.

The mobile stations A, B, and C, which have been notified that the transmission delay estimation information does not need to be transmitted, do not transmit the transmission delay estimation information.

Figure 18:
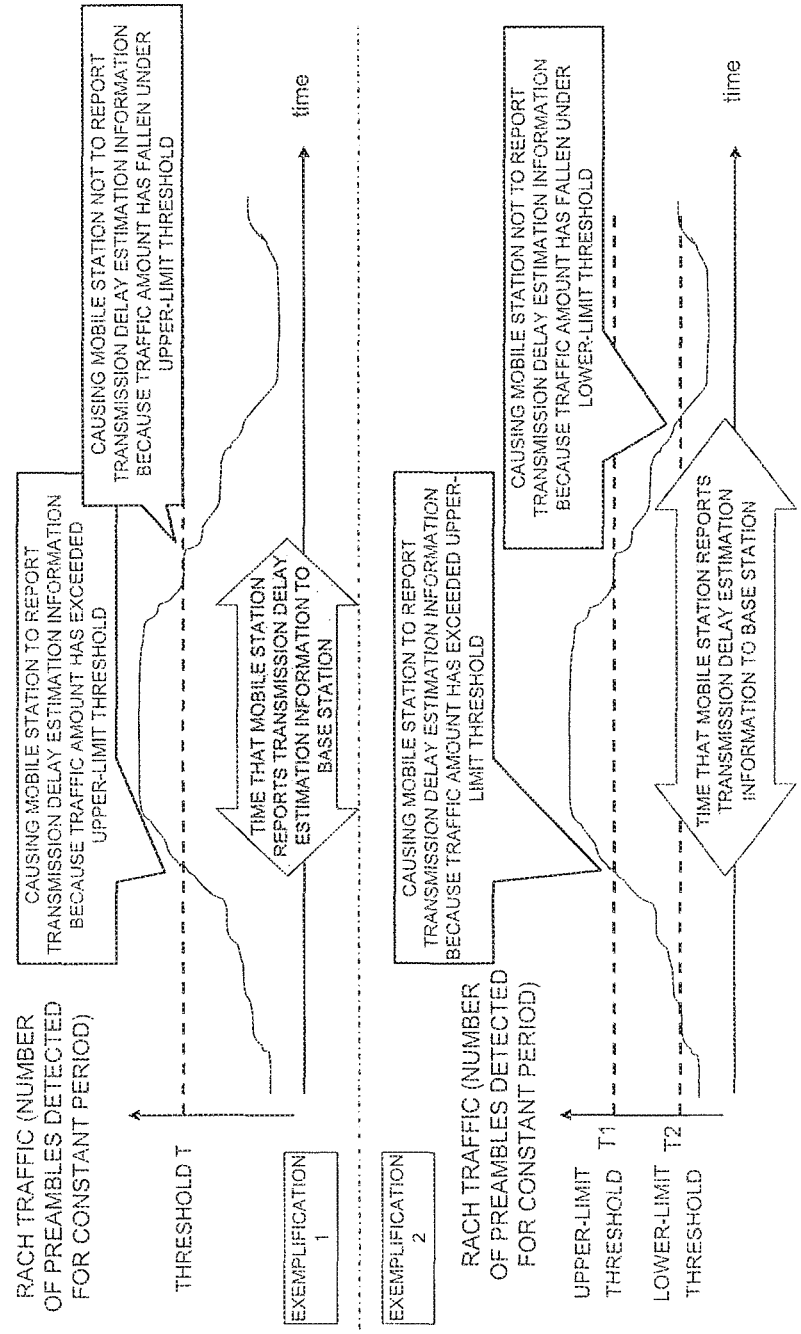
FIG. 18 is a diagram for explaining an example 5.

Additionally, while as shown in an exemplification 1 of FIG. 18, the case of causing the mobile station to transmit the transmission delay estimation information when the traffic amount exceeds a predetermined threshold T as a result of monitoring the traffic amount of the preamble of the random access channel was explained in the examples mentioned above, a scheme of causing the mobile station to transmit the transmission delay estimation information is mot limited hereto. For example, as shown in an exemplification 2 of FIG. 18, a configuration in which an upper-limit threshold and a lower-limit threshold are set, the mobile station is caused to transmit the transmission delay estimation information when the traffic amount exceeds an upper-limit threshold, and is caused not to transmit the transmission delay estimation information when the traffic amount has become smaller than an lower-limit threshold may be made.

EXAMPLE 6

In the example 6, the case that the transmission delay estimation information transmission condition is judged dependent upon an application, and in particular, the case that the application is a handover will be explained.

Figure 19:
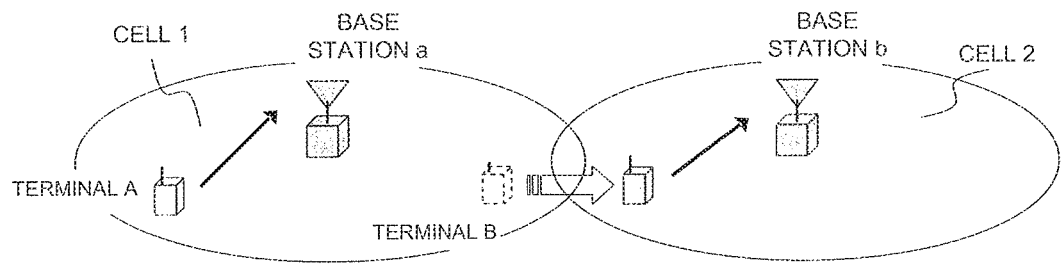
FIG. 19 is a diagram for explaining an example 6.

FIG. 19 is a diagram for explaining the example 6.

In FIG. 19, a terminal A, which stays in a cell 1, makes an access only to a base station a. In this case, the terminal A does not notify of the transmission delay estimation information. On the other hand, a terminal B performs a handover from the cell 1 to a cell 21 and makes an access to a base station b. In this case, the terminal B notifies the base station B of the transmission delay estimation information. That is, the terminal, which performs a handover, notifies of the transmission delay estimation information, and the terminal, which does not perform a handover, does not notify of the transmission delay estimation information.

Figure 20:
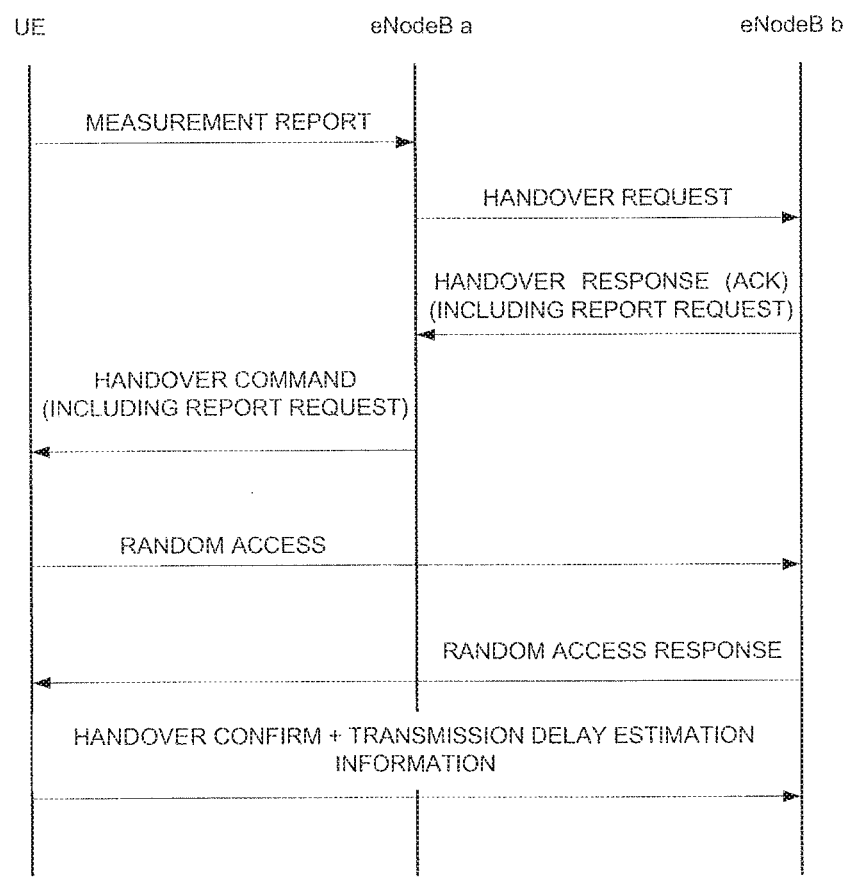
FIG. 20 is a diagram for explaining an example 6.

A specific operation will be explained by employing FIG. 20. Additionally, in FIG. 19, the case of the 3GPP LTE is imagined.

At first, UE B (mobile station) transmits Measurement report to an eNodeB a (base station a). The NodeB a having received the Measurement report makes a Handover request for an NodeB b.

The NodeB b having received the Handover request transmits a response (ACK) to the Handover request to the NodeB a. At this time, the NodeB b transmits the response including the Report request, being an instruction for causing the UE B to notify of the transmission delay estimation information.

The NodeB a having received the response (ACK) to the Handover request transmits Handover command to the UE B. At this time, the NodeB a transmits the command including the Report request.

The UE B having received the Handover command transmits the random access to the NodeB b. And, the NodeB b having received the random access transmits a response to the random access to the UE B.

The UE B having received the response to the random access transmits Handover confirm and the transmission delay estimation information to the NodeB b.

Figure 21:
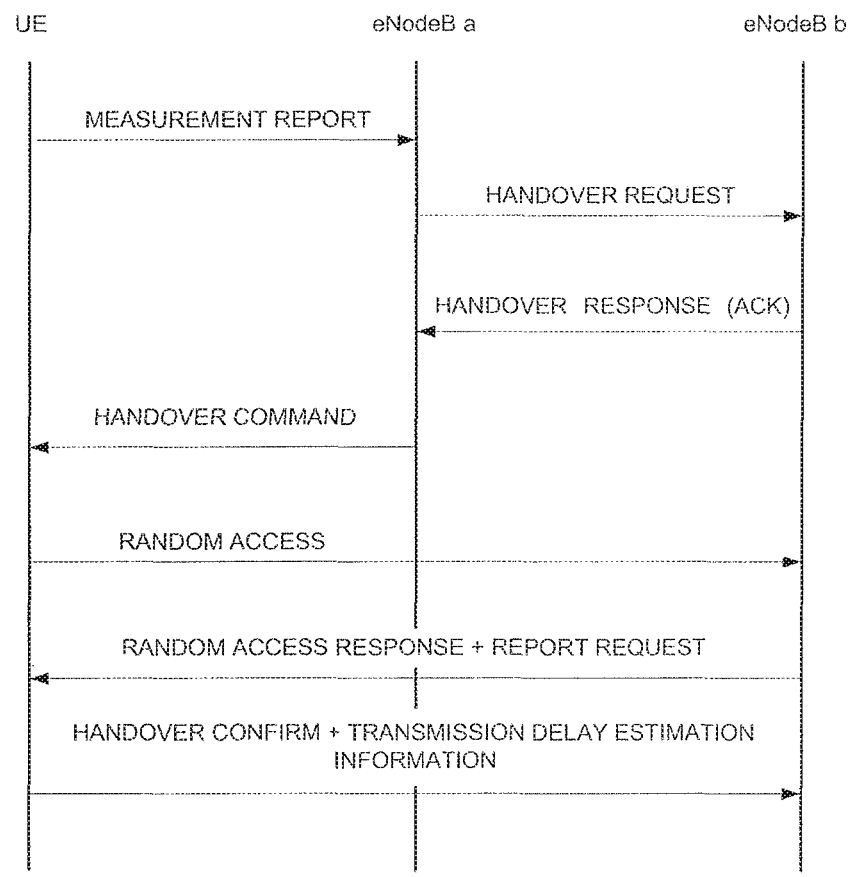
FIG. 21 is a diagram for explaining an example 6.
Figure 22:
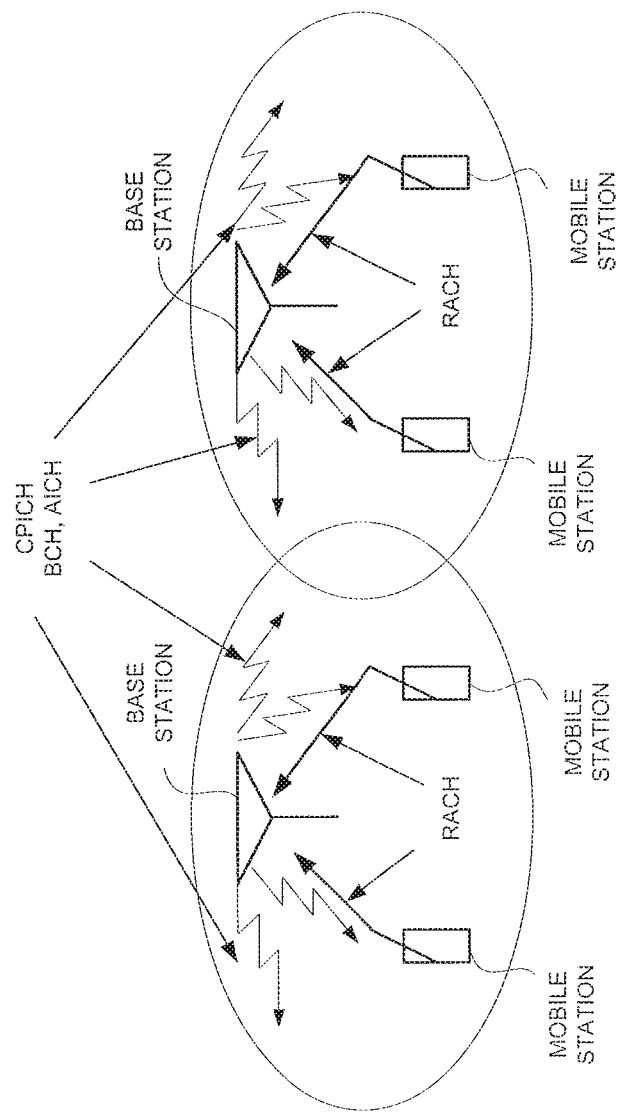
FIG. 22 is a conceptual diagram of the system to which the Patent document 1 related to the present invention is applied.
Figure 23:
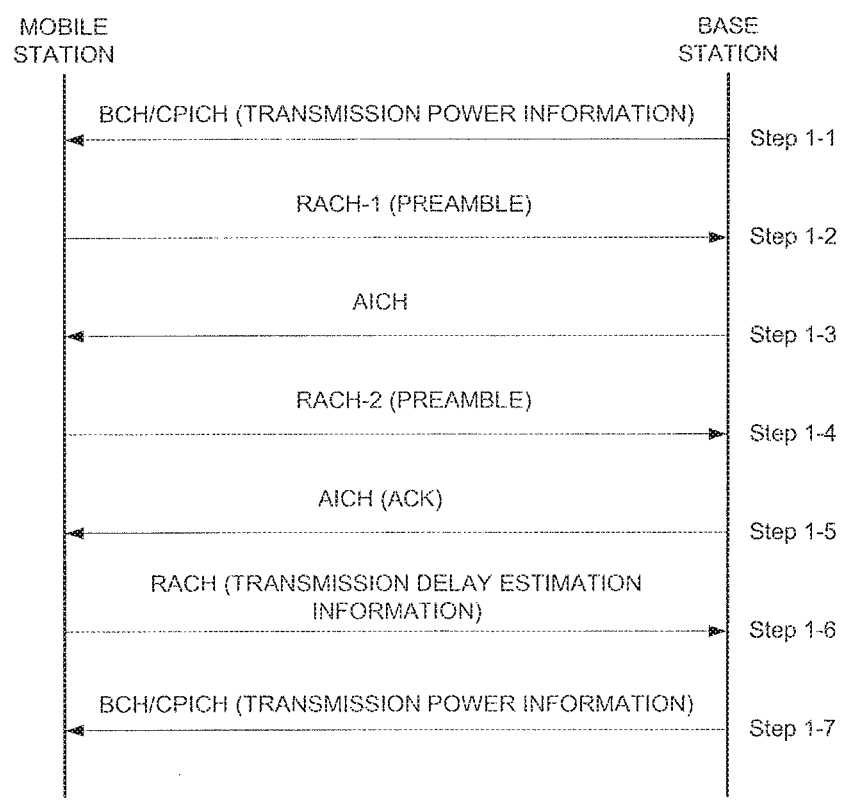
FIG. 23 is a sequence diagram of the system to which the Patent document 1 is applied.
Figure 24:
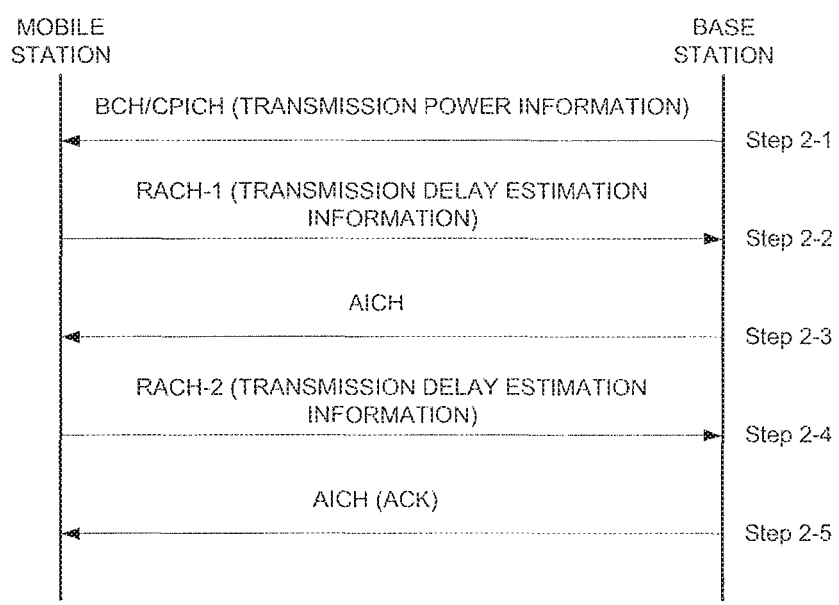
FIG. 24 is another sequence diagram of the system to which the Patent document 1 is applied.

Continuously, another specific operation will be explained by employing FIG. 21. Additionally, in FIG. 21 as well, the case of the 3GPP LTE is imagined.

At first, the UE B (mobile station) transmits the Measurement report to the eNodeB a (base station a). The NodeB a having received the Measurement report makes a Handover request for the NodeB b.

The NodeB b having received the Handover request transmits a response (ACK) to the Handover request to the NodeB a.

The NodeB a having received the response (ACK) to the Handover request transmits the Handover command to the UE B.

The UE B having received the Handover command transmits the random access to the NodeB b. And, the NodeB b having received the random access transmits a response to the random access to the UE B. At this time, the NodeB b transmits the Report request as well.

The UE B having received the response to the random access transmits the Handover confirm and the transmission delay estimation information to the NodeB b.

While the transmission delay estimation information was transmitted simultaneously with the Handover confirm in the above-mentioned example, the transmission delay estimation information may be transmitted after transmitting the Handover confirm.

The 1st mode of the present invention is characterized in that a radio communication system comprising a communication apparatus and a radio communication network system, wherein the communication apparatus comprises a transmission delay estimation information transmission unit for transmitting transmission delay estimation information to the radio communication network system when a transmission condition of transmission delay estimation information is met.

The 2nd mode of the present invention, in the above-mentioned mode, is characterized in that said transmission delay estimation information transmission unit transmits the transmission delay estimation information when the transmission condition of the transmission delay estimation information is met at the moment of transmitting an access signal.

The 3rd mode of the present invention, in the above-mentioned mode, is characterized in that said transmission delay estimation information transmission unit transmits the transmission delay estimation information when the transmission condition of the transmission delay estimation information is met after receiving an acknowledgment signal.

The 3rd mode of the present invention, in the above-mentioned mode, is characterized in that the radio communication system comprising a common control unit for causing the communication apparatus to commonly transmit the transmission delay estimation information.

The 4th mode of the present invention, in the above-mentioned mode, is characterized in that the radio communication system comprising a separate control unit for causing the communication apparatus to separately transmit the transmission delay estimation information.

The 5th mode of the present invention, in the above-mentioned mode, is characterized in that said radio communication network system comprises at least a base station.

The 7th mode of the present invention, in the above-mentioned mode, is characterized in that said transmission condition of the transmission delay estimation information is a condition based upon the number of times of transmission of the access signal.

The 8th mode of the present invention, in the above-mentioned mode, is characterized in that said transmission condition of the transmission delay estimation information is a condition based upon the number of times of retransmission of the access signal.

The 9th mode of the present invention, in the above-mentioned mode, is characterized in that said transmission condition of the transmission delay estimation information is a condition based upon a transmission power required at the time of completing the transmission.

The 10th mode of the present invention, in the above-mentioned mode, is characterized in that said transmission condition of the transmission delay estimation information is a condition based upon a report probability that said communication apparatus is caused to report said transmission delay information.

The 11th mode of the present invention, in the above-mentioned mode, is characterized in that said transmission condition of the transmission delay estimation information is a condition based upon a traffic of the access signal or all of traffics.

The 12th mode of the present invention, in the above-mentioned mode, is characterized in that said transmission condition of the transmission delay estimation information is a condition based upon a path loss.

The 13th mode of the present invention, in the above-mentioned mode, is characterized in that said transmission condition of the transmission delay estimation information is a condition based upon a time elapsed until an acknowledgment signal is received since the transmission of the access signal.

The 14th mode of the present invention, in the above-mentioned mode, is characterized in that said transmission condition of the transmission delay estimation information is a condition based upon an application of the access signal.

The 15th mode of the present invention, in the above-mentioned mode, is characterized in that a plurality of said transmission conditions of the transmission delay estimation information are combined and employed.

The 16th mode of the present invention, in the above-mentioned mode, is characterized in that said transmission delay estimation information is at least one of the number of times of transmission or the number of times of retransmission of the access signal, a time elapsed since initial transmission of the access signal, a timing of the initial transmission of the access signal, a back-off period required for transmitting the access signal, a value obtained by deducting the back-off period from a period required for transmitting the access signal, the number of times of power ramping required for transmitting the access signal, and the number of times of power ramping cycle required for transmitting the access signal.

The 17th mode of the present invention is characterized in that a communication apparatus, comprising a transmission delay estimation information transmission unit for transmitting transmission delay estimation information to a radio communication network system when a transmission condition of transmission delay estimation information is met.

The 18th mode of the present invention, in the above-mentioned mode, is characterized in that said transmission delay estimation information transmission unit transmits the transmission delay estimation information when the transmission condition of the transmission delay estimation information is met at the moment of transmitting an access signal.

The 19th mode of the present invention, in the above-mentioned mode, is characterized in that said transmission delay estimation information transmission unit transmits the transmission delay estimation information when the transmission condition of the transmission delay estimation information is met after receiving an acknowledgment signal.

The 20th mode of the present invention, in the above-mentioned mode, is characterized in that said transmission condition of the transmission delay estimation information is a condition based upon the number of times of transmission of the access signal.

The 21st mode of the present invention, in the above-mentioned mode, is characterized in that said transmission condition of the transmission delay estimation information is a condition based upon the number of times of retransmission of the access signal.

The 22nd mode of the present invention, in the above-mentioned mode, is characterized in that said transmission condition of the transmission delay estimation information is a condition based upon a transmission power required at the time of completing the transmission.

The 23rd mode of the present invention, in the above-mentioned mode, is characterized in that said transmission condition of the transmission delay estimation information is a condition based upon a report probability that said communication apparatus is caused to report said transmission delay information.

The 24th mode of the present invention, in the above-mentioned mode, is characterized in that said transmission condition of the transmission delay estimation information is a condition based upon a traffic of the access signal or all of traffics.

The 25th mode of the present invention, in the above-mentioned mode, is characterized in that said transmission condition of the transmission delay estimation information is a condition based upon a path loss.

The 26th mode of the present invention, in the above-mentioned mode, is characterized in that said transmission condition of the transmission delay estimation information is a condition based upon a time elapsed until an acknowledgment signal is received since the transmission of the access signal.

The 27th mode of the present invention, in the above-mentioned mode, is characterized in that said transmission condition of the transmission delay estimation information is a condition based upon an application of the access signal.

The 28th mode of the present invention, in the above-mentioned mode, is characterized in that a plurality of said transmission conditions of the transmission delay estimation information are combined and employed.

The 29th mode of the present invention, in the above-mentioned mode, is characterized in that said transmission delay estimation information is at least one of the number of times of transmission or the number of times of retransmission of the access signal, a time elapsed since initial transmission of the access signal, a timing of the initial transmission of the access signal, a back-off period required for transmitting the access signal, a value obtained by deducting the back-off period from a period required for transmitting the access signal, the number of times of power ramping required for transmitting the access signal, and the number of times of power ramping cycle required for transmitting the access signal.

The 30th mode of the present invention is characterized in that a radio communication network system in a communication system for transmitting transmission delay estimation information when a communication apparatus meets a transmission condition of the transmission delay estimation information, said radio communication network system comprising a common control unit for causing the communication apparatus to commonly transmit the transmission delay estimation information.

The 31st mode of the present invention is characterized in that a radio communication network system in a communication system for transmitting transmission delay estimation information when a communication apparatus meets a transmission condition of the transmission delay estimation information, said radio communication network system comprising a separate control unit for causing the communication apparatus to separately transmit the transmission delay estimation information.

The 32nd mode of the present invention is characterized in that a radio communication method, wherein a communication apparatus transmits transmission delay estimation information to a radio communication network system when a transmission condition of the transmission delay estimation information is met.

The 33rd mode of the present invention, in the above-mentioned mode, is characterized in that the communication apparatus transmits the transmission delay estimation information when the transmission condition of the transmission delay estimation information is met at the moment of transmitting an access signal.

The 34th mode of the present invention, in the above-mentioned mode, is characterized in that the communication apparatus transmits the transmission delay estimation information when the transmission condition of the transmission delay estimation information is met after receiving an acknowledgment signal.

The 35th mode of the present invention, in the above-mentioned mode, is characterized in that the radio communication network system causes the communication apparatus to commonly transmit the transmission delay estimation information.

The 36th mode of the present invention, in the above-mentioned mode, is characterized in that the radio communication network system causes the communication apparatus to separately transmit the transmission delay estimation information.

The 37th mode of the present invention, in the above-mentioned mode, is characterized in that the radio communication network system comprises at least a base station.

The 38th mode of the present invention, in the above-mentioned mode, is characterized in that said transmission condition of the transmission delay estimation information is a condition based upon the number of times of transmission of the access signal.

The 39th mode of the present invention, in the above-mentioned mode, is characterized in that said transmission condition of the transmission delay estimation information is a condition based upon the number of times of retransmission of the access signal.

The 40th mode of the present invention, in the above-mentioned mode, is characterized in that said transmission condition of the transmission delay estimation information is a condition based upon a transmission power required at the time of completing the transmission.

The 41st mode of the present invention, in the above-mentioned mode, is characterized in that said transmission condition of the transmission delay estimation information is a condition based upon a report probability that said communication apparatus is caused to report said transmission delay estimation information.

The 42nd mode of the present invention, in the above-mentioned mode, is characterized in that said transmission condition of the transmission delay estimation information is a condition based upon a traffic of the access signal or all of traffics.

The 43rd mode of the present invention, in the above-mentioned mode, is characterized in that said transmission condition of the transmission delay estimation information is a condition based upon a path loss.

The 44th mode of the present invention, in the above-mentioned mode, is characterized in that said transmission condition of the transmission delay estimation information is a condition based upon a time elapsed until an acknowledgment signal is received since the transmission of the access signal.

The 45th mode of the present invention, in the above-mentioned mode, is characterized in that said transmission condition of the transmission delay estimation information is a condition based upon an application of the access signal.

The 46th mode of the present invention, in the above-mentioned mode, is characterized in that a plurality of said transmission conditions of the transmission delay estimation information are combined and employed.

The 47th mode of the present invention, in the above-mentioned mode, is characterized in that said transmission delay estimation information is at least one of the number of times of transmission or the number of times of retransmission of the access signal, a time elapsed since initial transmission of the access signal, a timing of the initial transmission of the access signal, a back-off period required for transmitting the access signal, a value obtained by deducting the back-off period from a period required for transmitting the access signal, the number of times of power ramping required for transmitting the access signal, and the number of times of power ramping cycle required for transmitting the access signal.

The 48th mode of the present invention is characterized in that a program for causing a communication apparatus to execute a process of transmitting transmission delay estimation information to a radio communication network system when a transmission condition of the transmission delay estimation information is met.

The 49th mode of the present invention is characterized in that a program of a radio communication network system in a communication system for transmitting transmission delay estimation information when a communication apparatus meets a transmission condition of the transmission delay estimation information is met, said program causing the radio communication network system to execute a process of causing the communication apparatus to commonly transmit the transmission delay estimation information.

The 50th mode of the present invention is characterized in that a program of a radio communication network system in a communication system for transmitting transmission delay estimation information when a communication apparatus meets a transmission condition of the transmission delay estimation information, said program causing the radio communication network system to execute a process of causing the communication apparatus to separately transmit the transmission delay estimation information.

Above, although the present invention has been particularly described with reference to the preferred embodiments, examples, and modes thereof, it should be readily apparent to those of ordinary skill in the art that the present invention is not always limited to the above-mentioned embodiment and modes, and changes and modifications in the form and details may be made without departing from the sprit and scope of the invention.

This application is based upon and claims the benefit of priority from Japanese patent application No. 2008-57726, filed on Mar. 7, 2008, the disclosure of which is incorporated herein in its entirety by reference.

The invention claimed is:
1. A random access transmission method comprising:
    a) setting a number of preamble transmission to 1;
    b) transmitting, by a wireless transmitter implemented in a user equipment, a preamble using a random access channel;

c) receiving, by a wireless receiver implemented in the user equipment, a Random Access Response;

d) judging whether the Random Access Response reception is considered successful or not, and, in a case where the Random Access Response reception is considered not successful, incrementing the number of preamble transmission by 1;

e) repeating b) through d) until the Random Access Response reception is considered successful;

f) receiving, by the wireless receiver, a report request for reporting information indicating the number of preamble transmission after the Random Access Response reception is considered successful; and g) reporting, by the wireless transmitter, the information in a case where the report request is received, wherein the report request is received using a downlink channel for dedicated control and the report request is different from the Random Access Response, and wherein the information is reported using an uplink channel for dedicated control.

2. The random access transmission method according to claim 1, wherein the Random Access Response reception is considered successful, in a case where the received Random Access Response contains an identifier of the transmitted preamble.

3. A user equipment comprising:
a wireless transmitter;
a wireless receiver; and
a processor configured to perform following processes:
a) setting a number of preamble transmission to 1;
b) transmitting, by the wireless transmitter, a preamble using a random access channel;
c) receiving, by the wireless receiver, a Random Access Response;
d) judging whether the Random Access Response reception is considered successful or not, and, in a case where the Random Access Response reception is considered not successful, incrementing the number of preamble transmission by 1;
e) repeating b) through d) until the Random Access Response reception is considered successful;
f) receiving, by the wireless receiver, a report request for reporting information indicating the number of preamble transmission after the Random Access Response reception is considered successful; and
g) reporting, by the wireless transmitter, the information in a case where the report request is received, wherein the report request is received using a downlink channel for dedicated control and the report request is different from the Random Access Response, and wherein the information is reported using an uplink channel for dedicated control.

4. The user equipment according to claim 3, wherein the Random Access Response is considered successful, in a case where the received Random Access Response contains an identifier of the transmitted preamble.

* * * * *